United States Patent
Shimizu et al.

(10) Patent No.: US 9,634,825 B2
(45) Date of Patent: Apr. 25, 2017

(54) APPARATUS AND METHOD FOR CORRECTING TIME STAMPS OF TRANSACTIONS PERFORMED BY MULTIPLE SERVERS

(71) Applicant: FUJITSU LIMITED, Kawasaki-shi, Kanagawa (JP)

(72) Inventors: Toshihiro Shimizu, Sagamihara (JP); Motoyuki Kawaba, Kawasaki (JP); Yuuji Hotta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 14/305,327

(22) Filed: Jun. 16, 2014

(65) Prior Publication Data
US 2014/0297852 A1 Oct. 2, 2014

Related U.S. Application Data

(63) Continuation of application No. PCT/JP2011/079606, filed on Dec. 21, 2011.

(51) Int. Cl.
*G06F 15/173* (2006.01)
*H04L 7/00* (2006.01)
(Continued)

(52) U.S. Cl.
CPC .......... *H04L 7/0016* (2013.01); *H04J 3/0667* (2013.01); *H04L 43/02* (2013.01); *H04L 67/02* (2013.01)

(58) Field of Classification Search
USPC ....................................................... 709/226
See application file for complete search history.

(56) References Cited

U.S. PATENT DOCUMENTS 6,510,531 B1 * 1/2003 Gibbons .............. G06F 11/3672
707/999.007
7,165,252 B1 * 1/2007 Xu ........................ G06F 9/4887
718/100
(Continued)

FOREIGN PATENT DOCUMENTS

JP 2000-242618 9/2000
JP 2005-235054 9/2005
(Continued)

OTHER PUBLICATIONS

International Search Report, mailed in connection with PCT/JP2011/079606 and mailed Jan. 24, 2012.

*Primary Examiner* — Alicia Baturay
(74) *Attorney, Agent, or Firm* — Fujitsu Patent Center

(57) ABSTRACT

A first memory unit stores requester event information pieces each including time information indicating an occurrence time of an event associated with a process executed by a first server. A second memory unit stores request-destination event information pieces each including time information indicating an occurrence time of an event associated with a process executed by a second server in response to a request from the first server. A determining unit determines, for each request-destination event information piece, a correction allowable range of the time information by comparing the time information of the request-destination event information pieces with that of the requester event information pieces. A generating unit generates an information set by extracting, from the request-destination event information pieces arranged in chronological order according to the time information, chronologically consecutive request-destination event information pieces whose correction allowable ranges include a common value.

7 Claims, 20 Drawing Sheets

(51) Int. Cl.
*H04J 3/06* (2006.01)
*H04L 12/26* (2006.01)
*H04L 29/08* (2006.01)

(56) References Cited

U.S. PATENT DOCUMENTS

| | | | | |
|---|---|---|---|---|
| 7,720,648 B2* | 5/2010 | Paul | ............... | H04L 25/062 |
| | | | | 327/60 |
| 7,913,256 B2* | 3/2011 | Torii | ............... | G06F 9/4887 |
| | | | | 718/100 |
| 8,078,487 B2* | 12/2011 | Li | ............... | G06Q 10/06 |
| | | | | 700/100 |
| 2005/0018694 A1* | 1/2005 | Mitani | ............... | H04L 43/0852 |
| | | | | 370/396 |
| 2005/0193277 A1 | 9/2005 | Horikawa et al. | | |
| 2007/0140295 A1 | 6/2007 | Akaboshi | | |
| 2008/0263105 A1* | 10/2008 | Nakamura | ............... | H04L 43/0817 |
| 2009/0310729 A1* | 12/2009 | Liu | ............... | G06F 5/06 |
| | | | | 375/376 |
| 2012/0143992 A1* | 6/2012 | Salamatov | ............... | G06F 9/5027 |
| | | | | 709/219 |

FOREIGN PATENT DOCUMENTS

| | | |
|---|---|---|
| JP | 2006-011683 | 1/2006 |
| JP | 2007-166453 | 6/2007 |
| JP | 2008-064495 | 3/2008 |
| JP | 2008-269084 | 11/2008 |
| JP | 2011-154489 | 8/2011 |

* cited by examiner

120 WEB MESSAGE STORING UNIT

121 WEB MESSAGE MANAGEMENT TABLE

| TIME STAMP | TYPE (REQUEST/RESPONSE) | URL | SESSION ID | TRANSACTION ID |
|---|---|---|---|---|
| 1296721352.555546 | req | http://foo.co.jp/myapp/login | ses001 | – |
| 1296721352.555596 | res | – | ses001 | http-8080-2-11 |
| 1296721352.555886 | req | http://foo.co.jp/myapp/setdata | ses003 | – |
| 1296721352.557576 | res | – | ses003 | http-8080-2-15 |
| ... | ... | ... | ... | ... |

130 — APPLICATION MESSAGE STORING UNIT
131 APPLICATION MESSAGE MANAGEMENT TABLE

| START/END | TRANSACTION ID | TIME STAMP | CLASS NAME | METHOD NAME |
|---|---|---|---|---|
| E | http-8080-3-0 | 1310545073589963 | java.util.concurrent.atomic.AtomicLong | #incrementAndGet |
| S | http-8080-3-0 | 1310545073589973 | javax.management.ObjectName | #ObjectName |
| S | http-8080-3-0 | 1310545073589978 | java.util.logging.Logger | #isLoggable |
| S | http-8080-2-4 | 1310545073589982 | javax.management.ObjectName | #construct |
| S | http-8080-3-0 | 1310545073589984 | java.util.logging.Level | #intValue |
| S | http-8080-2-4 | 1310545073589987 | javax.management.ObjectName | #addProperty |
| E | http-8080-3-0 | 1310545073589990 | java.util.logging.Level | #intValue |
| E | http-8080-2-4 | 1310545073589991 | javax.management.ObjectName | #addProperty |
| E | http-8080-2-4 | 1310545073589993 | java.util.logging.Logger | #isLoggable |
| S | http-8080-3-0 | 1310545073589995 | javax.management.ObjectName | #addProperty |
| E | http-8080-3-0 | 1310545073589996 | javax.management.ObjectName | #addProperty |
| S | http-8080-3-0 | 1310545073589998 | javax.management.ObjectName | #addProperty |

140 DB MESSAGE STORING UNIT

141 DB MESSAGE MANAGEMENT TABLE

| ID | TIME STAMP | TYPE (REQUEST/RESPONSE) +PROTPCOL | TRANSACTION ID | SQL COMMAND/DATA |
|---|---|---|---|---|
| 1 | 1296721352.515389 | Request MySQL | - | QUERY:SET autocommit=0 |
| 1 | 1296721352.515503 | Response MySQL | - | 0 |
| 2 | 1296721352.535181 | Request MySQL | http-8080-2-19 | QUERY:select fooddata0_.foodId as foodId2_, fooddata0_.foodName as foodName2_... |
| 2 | 1296721352.535224 | Response MySQL | - | 0 |
| 3 | 1296721352.555536 | Request MySQL | - | QUERY:commit |
| 3 | 1296721352.555576 | Response MySQL | - | 0 |
| ... | ... | ... | ... | ... |

FIG. 8

APPARATUS AND METHOD FOR CORRECTING TIME STAMPS OF TRANSACTIONS PERFORMED BY MULTIPLE SERVERS

CROSS-REFERENCE TO RELATED APPLICATION

This application is a continuation application of International Application PCT/JP2011/079606 filed on Dec. 21, 2011 which designated the U.S., the entire contents of which are incorporated herein by reference.

FIELD

The embodiments discussed herein are related to an information processing apparatus and an information processing method.

BACKGROUND

In the operation and maintenance control of a web application for providing services to users through the Internet, performance measurements are carried out to monitor delay in processing executed in response to requests from users. For example, a series of processes executed in response to a processing request from a user is considered as a transaction, and the content of the transaction is analyzed. In the transaction analysis, for example, a Hypertext Transfer Protocol (HTTP) request-response process, from handling a first request up to returning a response to the user, and a database access process having taken place in the transaction are detected. Then, the detected processes are analyzed to thereby calculate the time taken for each of the processes.

In a transaction analytical method, messages moving over a network are intercepted by packet capture, logging, or the like. Among the intercepted messages, messages transmitted and received in the same transaction are associated with each other. Based on the group of the associated messages, the processing content of the transaction is analyzed. To associate messages, time information added to the messages, for example, is used. When information of a message is recorded, it is usually the case that time information is added thereto besides the message body. By determining the temporal relationship among events based on the time information of messages, it is possible to find a group of messages exchanged in the same transaction.

In the case where transaction analysis is performed using the time information of messages acquired by packet capture or logging, accurate synchronization of time between apparatuses used for obtaining messages has a beneficial effect on improving analysis accuracy. However, programs and apparatuses recording information, such as messages, independently measure the progress of time, and time differences usually exist among them. Because such apparatuses add time information to acquired messages based on their internal clocks, time differences also appear in the added time information. Time asynchronism in the time information of the messages results in inaccurate determination of the temporal relationship among the messages. This produces errors in determining which messages belong to the same transaction when the determination is made based on the time information of the messages.

The Network Time Protocol (NTP) has been conventionally used for clock synchronization between servers. Note however that the NTP application often fails to provide accurate synchronization sufficient to associate messages with each other. Furthermore, in the case where a single apparatus uses a plurality of different processes to obtain message information, the same effect as when there are time differences between apparatuses may be produced for the same original time information because the timing of adding a time stamp to a message is different among the processes.

Note that there is a technique for synchronizing the time of a server to another server in a remote location using a global positioning system (GPS), which however needs special hardware and thus leads to an increase in cost. Even if time synchronization is achieved by a GPS, the problem of time asynchronism due to differences in timing of adding a time stamp among processes still remains and is thus not solved simply by synchronizing time information between apparatuses.

Thus, inconsistency in time information of logs recorded by a plurality of different apparatuses may prevent accurate analysis. In view of this, a technique has been proposed to correct time stamps recorded in a plurality of logs output from a plurality of computers according to a time correction log and a consistency rule among the plurality of logs.
Japanese Laid-open Patent Publication No. 2006-11683
Japanese Laid-open Patent Publication No. 2008-269084

However, the conventional time correction method does not clearly determine the temporal range of information to which an obtained time correction value is applicable for correcting time information, and may therefore fail to use an appropriate correction value in the correction procedure. For example, when time difference per unit time varies, it may not be possible to find a common single correction value applicable to information over an excessively large temporal extent whilst maintaining temporal consistency among all the information in the temporal extent. Thus, if the application range of the obtained time correction value is inaccurate, the correction value is no longer appropriate, failing to achieve proper time correction.

SUMMARY

According to one embodiment, there is provided an information processing apparatus which includes a processor configured to perform a procedure including determining, with respect to each of a plurality of request-destination event information pieces each including time information indicating an occurrence time of an event associated with one of processes executed by a second server in response to an execution request from a first server, a correction allowable range of the time information by referring to the request-destination event information pieces and a plurality of requester event information pieces each including time information indicating an occurrence time of an event associated with one of processes executed by the first server and comparing the time information of the request-destination event information pieces and the time information of the requester event information pieces; and generating a request-destination event information set by extracting, from among the request-destination event information pieces arranged in chronological order according to the time information thereof, chronologically consecutive request-destination event information pieces whose correction allowable ranges include a common value.

The object and advantages of the invention will be realized and attained by means of the elements and combinations particularly pointed out in the claims.

BRIEF DESCRIPTION OF DRAWINGS

FIG. 6 illustrates an example of a data structure of a web message storing unit;

FIG. 7 illustrates an example of a data structure of an application message storing unit;

FIG. 8 illustrates an example of a data structure of a database message storing unit;

DESCRIPTION OF EMBODIMENTS

Figure 1:
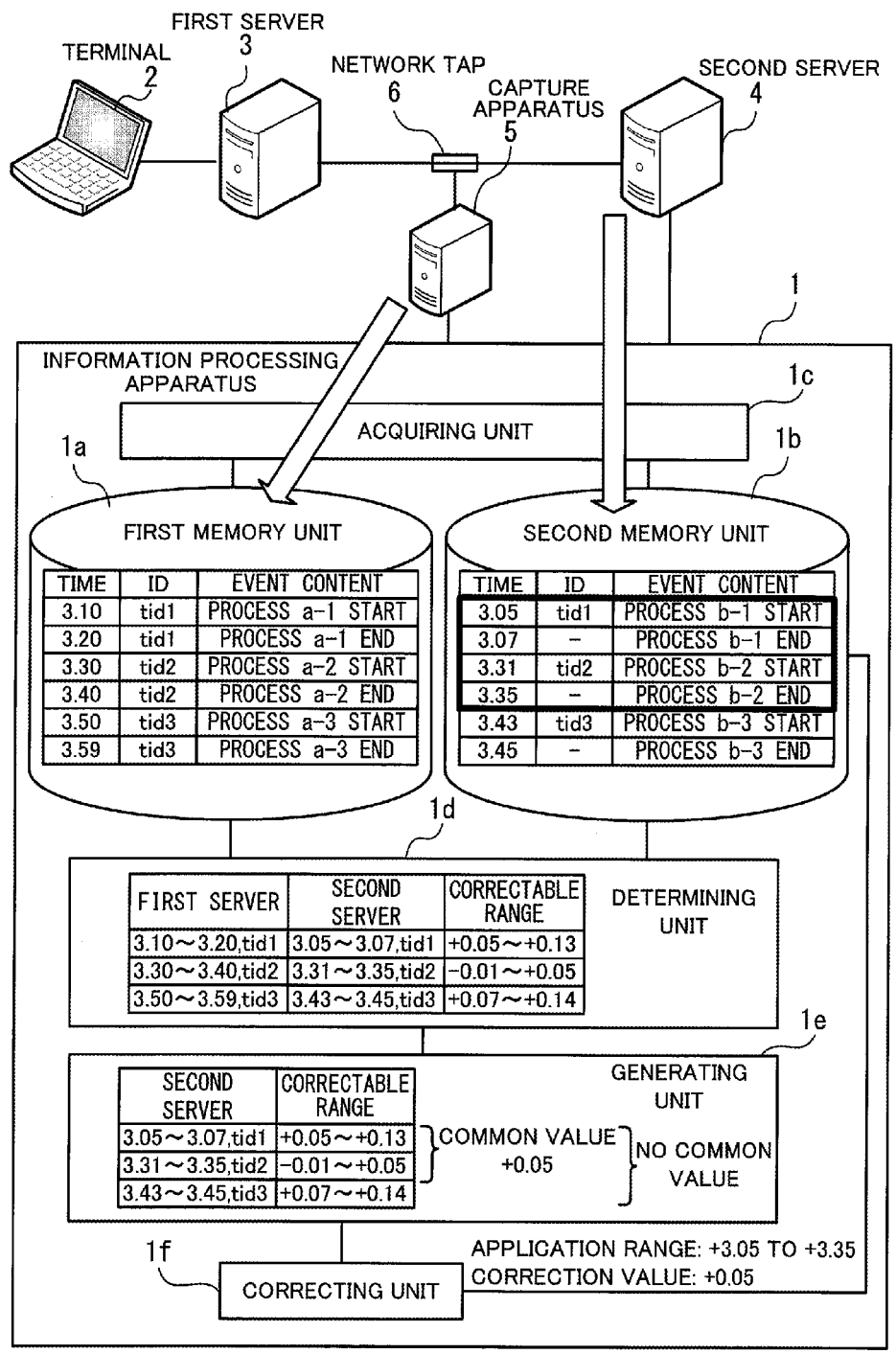
FIG. 1 illustrates an example of a system according to a first embodiment.

Several embodiments will be described below with reference to the accompanying drawings, wherein like reference numerals refer to like elements throughout. Note that two or more of the embodiments below may be combined for implementation in such a way that no contradiction arises.

(a) First Embodiment

FIG. 1 illustrates an example of a system according to a first embodiment. The system of the first embodiment includes, for example, an information processing apparatus 1, a terminal 2, a first server 3, a second server 4, and a capture apparatus 5.

The terminal 2 transmits a processing request to the first server 3, for example, according to an input from a user of the terminal 2. The first server 3 and the second server 4 cooperate with each other to execute transaction processes in response to the processing request from the terminal 2. Assume for example that the first server 3 functions as a web server and an application server and the second server 4 functions as a database server. In this case, the first server 3 executes a web service or an application processing service according to the processing request from the terminal 2, and transmits a request message to the second server 4 to access data managed by the second server 4. Note that the request message transmitted by the first server 3 to the second server 4 may include a transaction identifier. The second server 4 accesses the data according to the received request message, and returns the access result to the first server 3 as a response message.

The system according to the first embodiment has functions dedicated to the individual first and second servers 3 and 4, each of which is to record event information on events having taken place in association with processes in transactions. For example, when having executed a process as a part of a transaction in response to a request message, the first server 3 generates event information pieces individually associated with a start event and an end event of the executed process. Note that the first server 3 includes, in each of the generated event information pieces, time information indicating a time at which a corresponding event occurred (hereinafter, sometimes referred to as 'occurrence time'). In addition, the first server 3 generates an identifier uniquely identifying the executed transaction and then includes the transaction identifier in each of the generated event information pieces. Subsequently, the first server 3 stores the generated event information pieces in an internal storage device.

A network tap 6 is provided on a communication channel between the first server 3 and the second server 4, and the capture apparatus 5 is connected to the network tap 6. The network tap 6 transmits, to the capture apparatus 5, copies of packets transferred between the first server 3 and the second server 4. The capture apparatus 5 analyses packets transmitted from the network tap 6 to reproduce request messages issued from the first server 3 to the second server 4 and response messages returned from the second server 4 to the first server 3. Then, the capture apparatus 5 stores, in an internal storage device, event information pieces indicating event occurrence of the individual messages. Note that, when storing each event information piece, the capture apparatus 5 adds time information indicating the occurrence time of a corresponding event to the event information piece. In addition, if a transaction identifier is included in an acquired message, the capture apparatus 5 includes the identifier in a corresponding event information piece.

The information processing apparatus 1 includes a first memory unit 1a, a second memory unit 1b, an acquiring unit 1c, a determining unit 1d, a generating unit 1e, and a correcting unit 1f.

The first memory unit 1a stores therein pieces of requester event information, each including time information indicating the occurrence time of an event associated with a process executed by the first server 3 as part of a transaction. For example, at least some of the requester event information pieces in the first memory unit 1a individually include an identifier of a transaction containing a corresponding process executed by the first server 3.

The second memory unit 1b stores therein pieces of request-destination event information, each including time information indicating the occurrence time of an event associated with a process executed as part of a transaction by the second server 4 according to an execution request issued by the first server 3. For example, at least some of the request-destination event information pieces in the second memory unit 1b individually include an identifier of a transaction containing a corresponding process executed by the second server 4.

The acquiring unit 1c acquires, from the capture apparatus 5, each requester event information piece associated with a process executed by the first server 3 and then stores the request event information piece in the first memory unit 1a. The acquiring unit 1c also acquires, from the second server 4, each request-destination event information piece associated with a process executed by the second server 4 and then stores the request-destination event information piece in the second memory unit 1b.

The determining unit 1d refers to the first memory unit 1a and the second memory unit 1b and compares the time information of the request-destination event information pieces and that of the requester event information pieces. Then, the determining unit 1d determines a correction allowable range of the time information with respect to each of the request-destination event information pieces.

For example, the determining unit 1d determines an execution period of each process executed by the first server 3 based on a corresponding pair of requester event information pieces (hereinafter, simply referred to as 'requester event information pair'), which pair is composed of two requester event information pieces individually associated with the start and end of the process. The determining unit 1d also determines an execution period of each process executed by the second server 4 based on a corresponding pair of request-destination event information pieces ('request-destination event information pair'), which pair is composed of two request-destination event information pieces individually associated with the start and end of the process. Further, with respect to each request-destination event information pair, the determining unit 1d obtains a correction range allowing an execution period of a process corresponding to the request-destination event information pair to be corrected to fall within an execution period determined based on a requester event information pair having the same transaction identifier as the request-destination event information pair. The determining unit 1d then designates the obtained correction range as a correction allowable range of the time information of the request-destination event information pair.

The generating unit 1e generates a request-destination event information set by extracting, from among request-destination event information pieces arranged in chronological order according to the time information, chronologically consecutive pieces whose correction allowable ranges include a common value.

As for individual request-destination event information pieces belonging to the generated request-destination event information set, the correcting unit 1f corrects the time information of each of the request-destination event information pieces stored in the second memory unit 1b using the common correction value found among the correction allowable ranges of the request-destination event information pieces.

With the above-described system, the first server 3 and the second server 4 carry out transaction processes according to a processing request from the terminal 2. The capture apparatus 5 records each requester event information piece associated with a process executed by the first server 3. The second server records each request-destination event information piece associated with a process executed by the second server 4. In this situation, if internal clocks of the capture apparatus 5 and the second server 4 are not synchronized with each other, time difference appears in the time information added to event information pieces recorded by each of the capture apparatus 5 and the second server 4. In view of this, the information processing apparatus 1 determines a correction value for the time difference and the application range of the correction value.

For example, the acquiring unit 1c of the information processing apparatus 1 acquires, from the capture apparatus 5, each requester event information piece, which is then stored in the first memory unit 1a. The acquiring unit 1c also acquires, from the second server 4, each request-destination event information piece, which is then stored in the second memory unit 1b.

Subsequently, the determining unit 1d refers to the first memory unit 1a and the second memory unit 1b to thereby compare the time information of request-destination event information pieces against the time information of requester event information pieces. Then, the determining unit 1d determines a correction allowable range of the time information with respect to each request-destination event information piece.

According to the example of FIG. 1, the first server 3 and the second server 4 have carried out transactions with identifiers tid1, tid2, and tid3. The first memory unit 1a stores therein requester event information pieces indicating individual events of the start and end of a process executed by the first server 3 in each of the transactions. Based on a requester event information pair composed of two requester event information pieces having the same transaction identifier, the execution period of a process in the transaction at the first server 3 is determined. For example, the start time and the end time of a process in the transaction with the identifier tid1 at the first server 3 are 3.10 seconds and 3.20 seconds, respectively. Then, the execution period of the process in the transaction with the identifier tid1 at the first server 3 is determined as '3.10 to 3.20'. Similarly, the execution period of a process in the transaction with the identifier tid2 at the first server 3 is determined as '3.30 to 3.40', and the execution period of a process in the transaction with the identifier tid3 at the first server 3 is determined as '3.50 to 3.59'.

The second memory unit 1b stores therein request-destination event information pieces indicating individual events of the start and end of a process executed by the second server 4 in each of the transactions. Based on a request-destination event information pair composed of two request-destination event information pieces having the same transaction identifier, the execution period of a process in the transaction at the second server 4 is determined. For example, the start time and the end time of a process in the transaction with the identifier tid1 at the second server 4 are 3.05 seconds and 3.07 seconds, respectively. Then, the execution period of the process in the transaction with the identifier tid1 at the second server is determined as '3.05 to 3.07'. Similarly, the execution period of a process in the transaction with the identifier tid2 at the second server 4 is determined as '3.31 to 3.35', and the execution period of a process in the transaction with the identifier tid3 at the second server 4 is determined as '3.43 to 3.45'.

In this case, the correction allowable range of the request-destination event information pair associated with the transaction identifier tid1 is a value range allowing the period of 3.05 to 3.07 to be collected to fall within the range of 3.10 to 3.20. Here, with a range of +0.05 to +0.13, the period of 3.05 to 3.07 is corrected to fall within the range of 3.10 to 3.20. Therefore, the correction allowable range is +0.05 to +0.13. Similarly, the correction allowable ranges of the request-destination event information pairs associated with the transaction identifiers tid2 and tid3 are ranges of −0.01 to +0.05 and +0.07 to +0.14, respectively.

Once the correction allowable ranges are obtained, the generating unit 1e generates a request-destination event information set by extracting, from among request-destination event information pieces arranged in chronological order according to the time information, chronologically consecutive pieces whose correction allowable ranges include a common value. For example, the generating unit 1e sequentially selects request-destination event information pairs in chronological order. Each time selecting a new request-destination event information pair, the generating unit 1e determines whether there is a common value between a common range found in the correction allowable ranges of already selected request-destination event information pairs and the correction allowable range of the newly selected request-destination event information pair. If there is a common value, the newly selected request-destination event information pair is added to the request-destination event information set in which all request-destination event information pairs have the common value in their correction allowable ranges.

According to the example of FIG. 1, for example, the request-destination event information pairs with the transaction identifiers tid1 and tid2 are selected first. The correction allowable ranges of the selected request-destination event information pairs include a common value, +0.05. Therefore, individual request-destination event information pieces making up the request-destination event information pairs with the transaction identifiers tid1 and tid2 are placed in the same set.

Then, the request-destination event information pair with the transaction identifier tid3 is selected next. The selected request-destination event information pair has a correction allowable range of +0.07 to +0.14. In this case, there is no common value between the common value +0.05 of the correction allowable ranges of the previously selected request-destination event information pairs and the correction allowable range +0.07 to +0.14 of the newly selected request-destination event information pair. Therefore, information pieces making up the request-destination event information pair with the transaction identifier tid3 are placed in a different set from the set of the previous request-destination event information pieces. As a result, it is determined that chronologically consecutive request-destination event information pieces in the second memory unit 1b starting from the request-destination event information piece with the time information '3.05' up to the request-destination event information piece with the time information '3.35' are placed in the same single set.

Once a request-destination event information set is determined, the correcting unit 1f corrects the time information of the individual request-destination event information pieces of the set by using the same single correction value. For example, in the case where the chronologically consecutive range starting from the request-destination event information piece with the time information '3.05' up to the request-destination event information piece with the time information '3.35' is determined as the application range, the time information of each of the request-destination event information pieces in the application range is corrected using, as a correction value, the common value +0.05 found in the correction allowable ranges of the request-destination event information pieces. For example, the correction value is added to a value indicated by the time information of each of the request-destination event information pieces.

In the above-described manner, a correction allowable range is determined for each request-destination event information piece, and then chronologically consecutive request-destination event information pieces whose correction allowable ranges include a common value are placed in a set subject to time correction using the same single correction value. Because the request-destination event information pieces placed into the set generated in such a manner have the common value in their correction allowable ranges, the correction of the time information using the common value as a correction value ensures temporal consistency between the requester and the request destination in terms of the execution periods of their processes after the time correction. That is, appropriate correction is made for the time information of the request-destination event information pieces. The appropriate correction for the time information improves, for example, the reliability of transaction analysis based on requester event information and request-destination event information.

The acquiring unit 1c, the determining unit 1d, the generating unit 1e, and the correcting unit 1f may be implemented by a central processing unit (CPU) of the information processing apparatus 1. In addition, the first memory unit 1a and the second memory unit 1b may be implemented, for example, by random access memory (RAM) and a hard disk drive (HDD) of the information processing apparatus 1.

Note that, in FIG. 1, each line connecting the individual components represents a part of communication paths, and communication paths other than those illustrated in FIG. 1 are also configurable.

(b) Second Embodiment

A second embodiment is described next. The second embodiment is directed to determining, in an analyzer for analyzing transactions, correction values for time information prior to transaction analysis. Note that the second embodiment uses, as an example, a web three-tier system for providing services using the World Wide Web (WWW). In the web three-tier system, transaction processes are categorized into three layers: a web layer for providing access to the services using the WWW; an application layer for performing various types of data processing; and a database (DB) layer for managing data. In the web three-tier system, the web layer is the highest layer, the application layer is the middle layer, and the database layer is the lowest layer.

In the second embodiment, information on messages (message information) input and output to and from individual servers is used as an example of the event information of the first embodiment. For example, an input of a request message to a server is recognized as the occurrence of a process start event in the server. In addition, an output of a response message from a server is recognized as the occurrence of a process end event in the server.

According to the second embodiment, message information pieces individually indicating the start and end of a single process are associated with each other to be a message information pair. Then, with respect to each message information pair, a correction allowable range of time information of the paired message information pieces is determined. Hereinafter, the correction allowable range of time information is referred to as the 'time correction range'. In addition, to determine the correction value and the application range of the correction value, the second embodiment also uses message information pieces with no transaction identifier attached. A message with a transaction identifier and a message with no transaction identifier have different time correction ranges.

Figure 2:
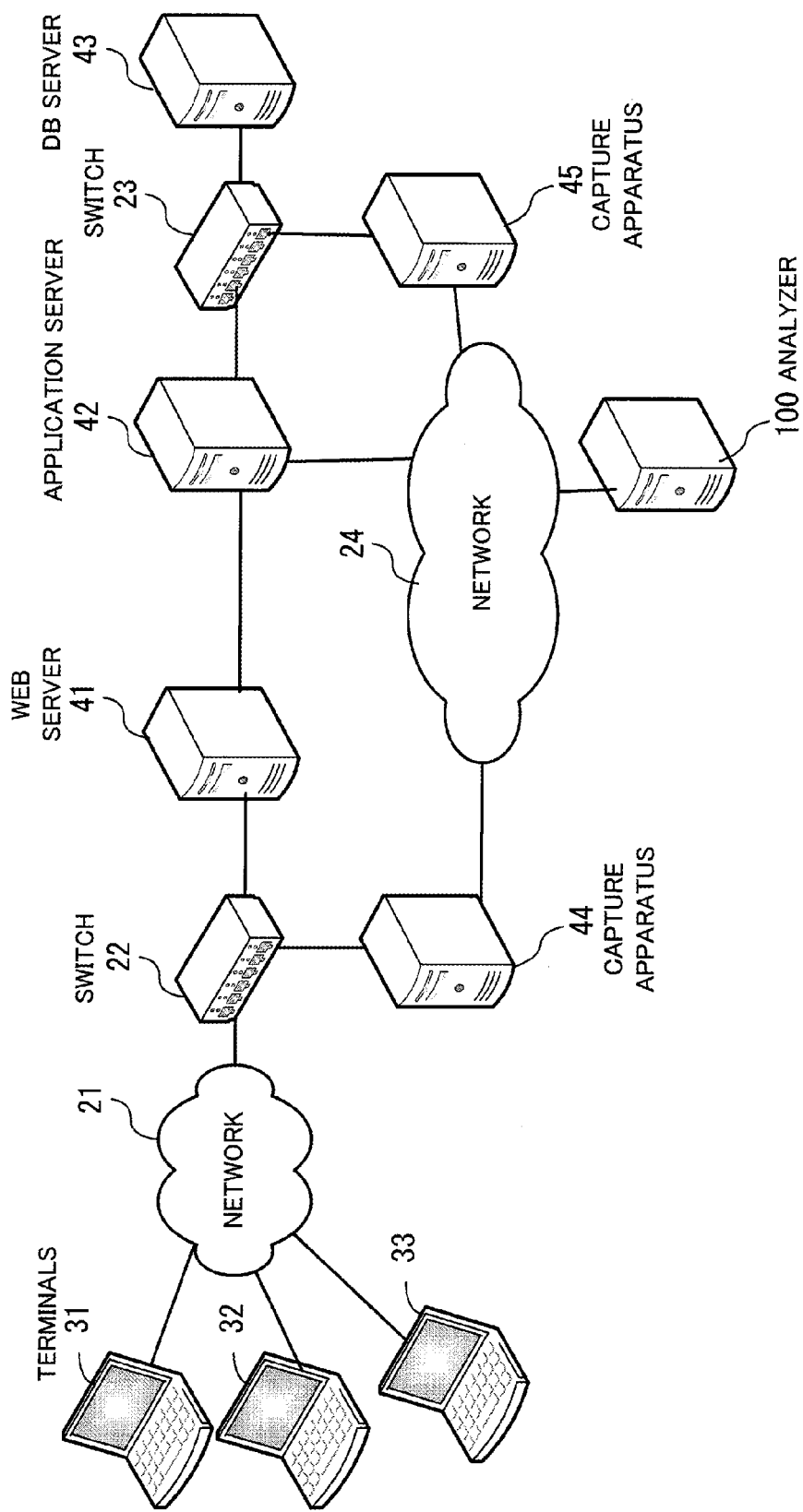
FIG. 2 illustrates an example of a system configuration according to a second embodiment.

FIG. 2 illustrates an example of a system configuration according to the second embodiment. FIG. 2 depicts an example of a system for providing services using the web three-tier system. In this system, terminals 31 to 33 are connected to a web server 41 via a network 21 and a switch 22. The terminals 31 to 33 are apparatuses, such as computers and mobile terminals, used by users who receive provision of services.

The switch 22 is, for example, a layer 2 switch, and is provided with a capture port to tap a relayed packet signal and then output the packet signal. A capture apparatus 44 is connected to the capture port of the switch 22.

The web server 41 is a computer with an information and communication function supported by the WWW. The web server 41 executes processes in response to requests from the terminals 31 to 33 and then returns the processing results. In the case of using a processing function of an application server 42 during the execution of a process, the web server 41 transmits a processing request to the application server 42 and then receives the processing result.

Note that, upon receiving a request message for requesting a process from one of the terminals 31 to 33, for example, the web server 41 generates a transaction identifier uniquely identifying a transaction to be executed according to the request message. Then, in the case of requesting the application server 42 to carry out part of the transaction processing, the web server 41 transmits, to the application server 42, a request message with the transaction identifier of the transaction attached thereto. Further, the web server 41 attaches the transaction identifier of the transaction to a response message indicating a result of the transaction processing.

The application server 42 is a computer for executing various types of application software. The application server 42 executes a process in response to a request from the web server 41 and then returns the execution result. Note that, if a process of accessing data managed by a database server 43 occurs during the execution of the process, the application server 42 transmits a processing request for data access to the database server 43 and receives the processing result. In addition, the application server 42 stores history of each message (application message) transmitted or received in association with an executed process, with a time stamp (time information) attached. Note that the application server 42 adds transaction identifiers included in request messages from the web server 41 to at least some of request messages to be transmitted to the database server 43.

The database server 43 is connected to the application server 42 via a switch 23. The database server 43 is a computer for managing its database. The database server 43 executes a process in response to a request from the application server 42 and then returns the execution result.

The switch 23 is, for example, a layer 2 switch, and is provided with a capture port to tap a relayed packet signal and then output the packet signal. A capture apparatus 45 is connected to the capture port of the switch 23.

The capture apparatus 44 is a computer for acquiring each packet transmitted or received between the individual terminals 31 to 33 and the web server 41 via the switch 22. The capture apparatus 44 analyzes a message (web message) included in the acquired packet and stores the message after adding a time stamp thereto.

The capture apparatus 45 is a computer for acquiring each packet transmitted or received between the application server 42 and the database server 43 via the switch 23. The capture apparatus 45 analyzes a message (database message) included in the acquired packet and stores the message after adding a time stamp thereto.

An analyzer 100 is connected to the application server 42 and the capture apparatuses 44 and 45 via a network 24. The analyzer 100 is a computer for analyzing a series of transactions whose processes have been executed by the web server 41, the application server 42, and the database server 43. For example, the analyzer 100 acquires, from the capture apparatus 44, information on messages transmitted and received between the individual terminals 31 to 33 and the web server 41. The analyzer 100 also acquires, from the application server 42, information on messages transmitted and received between the web server 41 and the application server 42. Further, the analyzer 100 acquires, from the capture apparatus 45, information on messages transmitted and received between the application server 42 and the database server 43. Then, the analyzer 100 analyzes the acquired message information and determines, for example, an average processing time of each server with respect to each type of transaction.

When analyzing messages, the analyzer 100 associates messages related to processes of the same transaction. Thus, the analyzer 100 analyzes the associated messages of each transaction, which allows, for example, analysis of the processing time of each transaction in each layer.

Note here that, as for processes of the same transaction, the execution period of a process in a lower-level layer is contained in the execution period of a process in a higher-level layer. Therefore, in a single transaction, a request message and a response message to and from the lower-level layer occur between a request message and a response message to and from the higher-level layer. Messages satisfying such a condition are associated with each other, which allows a set of messages having occurred in the same transaction to be generated. Whether or not satisfying this condition may be determined, for example, by arranging the messages in chronological order.

Here, if the time of the time stamp added to each of the messages is accurate, it is possible to place the messages correctly in chronological order. However, according to the second embodiment, the time stamp for each web message is added by the capture apparatus 44. The time stamp for each application message is added by the application server 42. The time stamp for each database message is added by the capture apparatus 45. If there are differences in time among the internal clocks of the application server 42 and the individual capture apparatuses 44 and 45, time differences also appear in the time indicated by the time stamps. Even if the internal clocks of the application server 42 and the individual capture apparatuses 44 and 45 are in sync with each other, differences in the timing of adding a time stamp among processes develop into subtle time differences on the scale of, for example, 0.01 second. Such time differences make it difficult to place the messages correctly in chronological order as the messages were transmitted.

In view of the above-described problems, the analyzer 100 calculates correction values for correcting the time of messages with time stamps added by different apparatuses, and places the messages in chronological order after the time correction using the correction values. This allows the temporal inclusion relation between each higher-level process and a lower-level process executed after being called by the higher-level process to be reproduced correctly, thus enabling correct determination of a set of messages included in the same transaction.

To correct the time of messages, the analyzer 100 sequentially obtains the time correction range for each of the messages. Note that, according to the second embodiment, the time correction range is obtained with respect to each message pair formed by associating a request message of a process with a response message of the process. In this regard, the time correction range is obtained not only for messages with a transaction identifier but also for messages with no transaction identifier. Then, the analyzer 100 acquires message pairs with a transaction identifier one by one. With each acquisition, the analyzer 100 obtains an intersection of the time correction ranges of message pairs acquired to that point in time, which intersection is designated as the time correction range of a set of the acquired message pairs. If the intersection of the time correction ranges becomes an empty set, the analyzer 100 determines the set of all the acquired message pairs except for the pair acquired at the end as a set of messages subject to time correction using the same single correction value. Then, the analyzer 100 corrects the time of the individual messages belonging to the set using a common value among the time correction ranges of the message pairs of the set.

Figure 3:
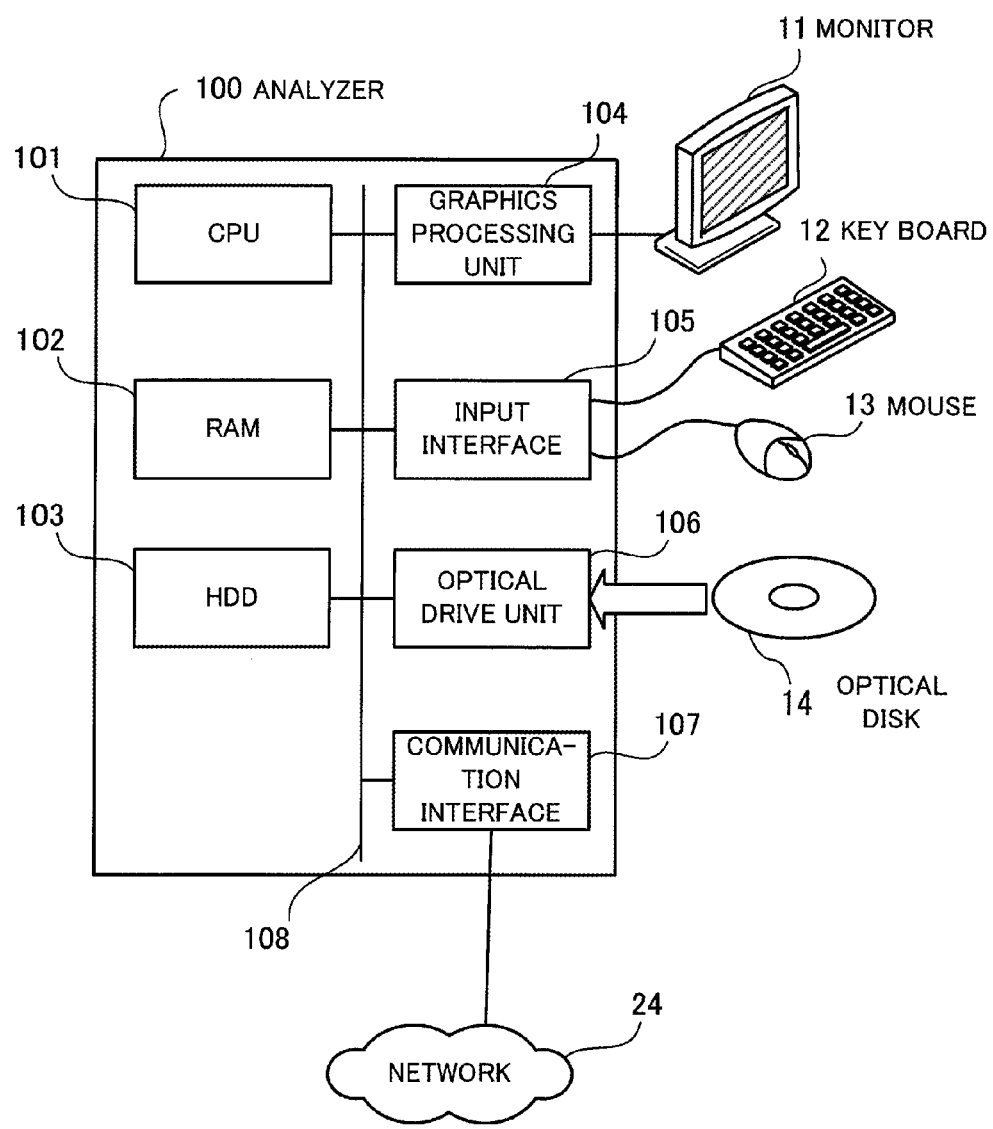
FIG. 3 illustrates an example of a hardware configuration of an analyzer used in the second embodiment.

The analyzer 100 implementing the above-described processing is composed of the following hardware components, for example. FIG. 3 illustrates an example of a hardware configuration of an analyzer used in the second embodiment. Overall control of the analyzer 100 is exercised by a CPU 101. To the CPU 101, a RAM 102 and a plurality of peripherals are connected via a bus 108.

The RAM 102 is used as a main storage device of the analyzer 100. The RAM 102 temporarily stores at least part of an operating system (OS) program and application programs to be executed by the CPU 101. The RAM 102 also stores therein various types of data to be used by the CPU 101 for its processing.

The peripherals connected to the bus 108 include a HDD 103, a graphics processing unit 104, an input interface 105, an optical drive unit 106, and a communication interface 107.

The HDD 103 magnetically writes and reads data to and from a built-in disk, and is used as a secondary storage device of the analyzer 100. The HDD 103 stores therein the OS program, application programs, and various types of data. Note that a semiconductor storage device such as a flash memory may be used as a secondary storage device in place of the HDD 103.

To the graphics processing unit 104, a monitor 11 is connected. According to an instruction from the CPU 101, the graphics processing unit 104 displays an image on a screen of the monitor 11. A cathode ray tube (CRT) display or a liquid crystal display, for example, may be used as the monitor 11.

To the input interface 105, a keyboard 12 and a mouse 13 are connected. The input interface 105 transmits signals sent from the keyboard 12 and the mouse 13 to the CPU 101. Note that the mouse 13 is just an example of pointing devices, and a different pointing device such as a touch panel, a tablet, a touch-pad, and a trackball, may be used instead.

The optical drive unit 106 reads data recorded on an optical disk 14 using, for example, laser light. The optical disk 14 is a portable recording medium on which data is recorded in such a manner as to be read by reflection of light. Examples of the optical disk 14 include a digital versatile disc (DVD), a DVD-RAM, a compact disk read only memory (CD-ROM), a CD recordable (CD-R), and a CD-rewritable (CD-RW).

The communication interface 107 is connected to the network 24. The communication interface 107 transmits and receives data to and from the application server 42 and the individual capture apparatuses 44 and 45 via the network 24.

The hardware configuration described above achieves the processing functions of the second embodiment. Note that the information processing apparatus 1 of the first embodiment may be constructed with the same hardware configuration as the analyzer 100 of FIG. 3.

Figure 4:
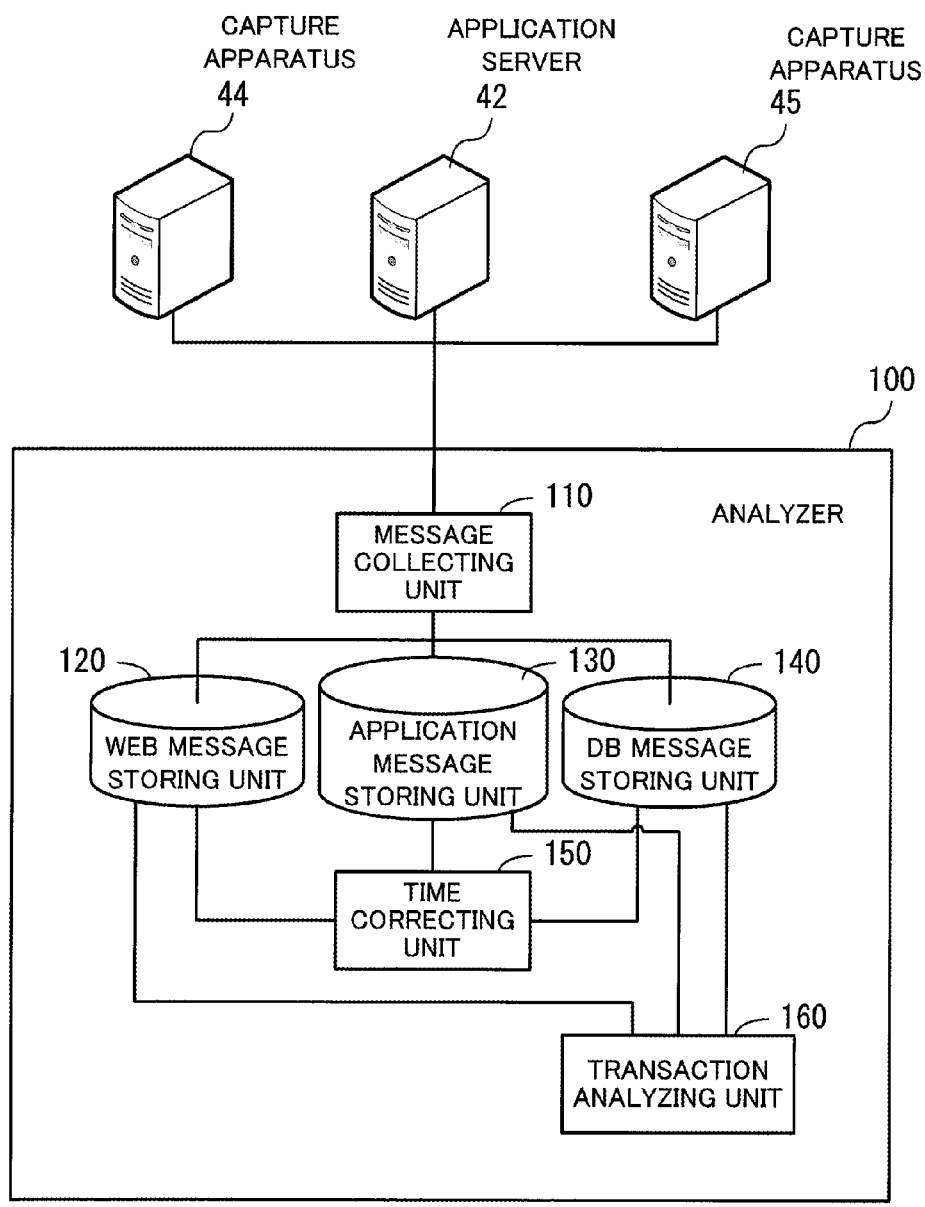
FIG. 4 is a block diagram illustrating an example of functions of the analyzer.

FIG. 4 is a block diagram illustrating an example of functions of an analyzer. The analyzer 100 includes a message collecting unit 110, a web message storing unit 120, an application message storing unit 130, a database message storing unit 140, a time correcting unit 150, and a transaction analyzing unit 160.

The message collecting unit 110 collects messages from the application server 42 and the individual capture apparatuses 44 and 45. For example, the message collecting unit 110 acquires, from the capture apparatus 44, web messages stored therein and then stores the acquired messages in the web message storing unit 120. The message collecting unit 110 also acquires, from the application server 42, application messages stored therein and then stores the acquired messages in the application message storing unit 130. Further, the message collecting unit 110 acquires, from the capture apparatus 45, database messages stored therein and then stores the acquired messages in the database message storing unit 140.

The web message storing unit 120 stores therein web messages exchanged between the individual terminals 31 to 33 and the web server 41. A part of the storage area of the RAM 102 or the HDD 103, for example, is used as the web message storing unit 120.

The application message storing unit 130 stores therein application messages exchanged between the web server 41 and the application server 42. A part of the storage area of the RAM 102 or the HDD 103, for example, is used as the application message storing unit 130.

The database message storing unit 140 stores therein database messages exchanged between the application server 42 and the database server 43. A part of the storage area of the RAM 102 or the HDD 103, for example, is used as the database message storing unit 140.

The time correcting unit 150 calculates correction values used in time information correction among web messages, application messages and database messages. The time correcting unit 150 corrects the time of messages stored in one of the message storing units, using the calculated correction values.

The transaction analyzing unit 160 arranges the messages stored in the message storing unit in chronological order according to the corrected time. Then, based on the messages arranged in chronological order, the transaction analyzing unit 160 associates messages transmitted in each transaction. Based on information of the associated messages, the transaction analyzing unit 160 analyzes the processing time of the transaction at each server. Note that a transaction analytical technique based on messages is disclosed, for example, in Japanese Laid-open Patent Publication No. 2006-11683 mentioned above.

Note that, in FIG. 4, each line connecting the individual components represents only a part of communication paths, and communication paths other than those illustrated in FIG. 4 are also configurable.

The analyzer 100 having the above-described functions reproduces transactions executed in the web three-tier system, which are subsequently analyzed. Note that each of the following functions of FIG. 4 is an example of corresponding unit of the first embodiment of FIG. 1: the message collecting unit 110 is an example of the acquiring unit 1c; the time correcting unit 150 is an example of an integrated assembly of the determining unit 1d, the generating unit 1e, and the correcting unit 1f; the web message storing unit 120 is an example of the first memory unit 1a; the application message storing unit 130 is an example of the second memory unit 1b in the case of determining correction values for time correction between web messages and application messages; the application message storing unit 130 is an example of the first memory unit 1a in the case of determining correction values for time correction between application messages and database messages; and the database message storing unit 140 is an example of the second memory unit 1b.

Figure 5:
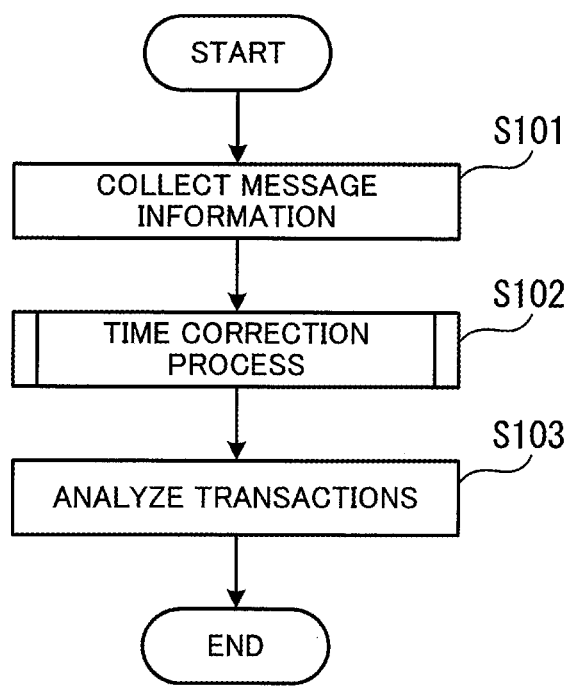
FIG. 5 is a flowchart illustrating a procedure of a transaction analysis process.

Next described is a procedure of a transaction analysis process. FIG. 5 is a flowchart illustrating a procedure of a transaction analysis process. The transaction analysis process of FIG. 5 is described next according to the step numbers in the flowchart.

[Step S101] The message collecting unit 110 collects message information from the application server 42 and the individual capture apparatuses 44 and 45. For example, when an instruction for transaction analysis is input by operation of an administrator, the message collecting unit 110 collects message information. The message collecting unit 110 stores message information collected from the capture apparatus 44 in the web message storing unit 120. The message collecting unit 110 stores message information collected from the application server 42 in the application message storing unit 130. Further, the message collecting unit 110 stores message information collected from the capture apparatus 45 in the database message storing unit 140.

[Step S102] The time correcting unit 150 corrects the time added to messages. To correct the time, the time correcting unit 150 calculates sets of messages in each layer and a correction value to be applied to the messages of each of the sets. Here, each of the sets is subject to correction of the time added to the messages belonging to the set using the same single correction value. For example, the time correcting unit 150 calculates correction values for application messages based on the time added to web messages. The time correcting unit 150 also calculates correction values for database messages based on the time added to the application messages. Then, the time correcting unit 150 corrects the time of messages stored in one of the message storing units, with respect to each set of messages using a correction value calculated based on the messages belonging to the set. The details of the process are described later (see FIG. 19).

[Step S103] The transaction analyzing unit 160 takes messages out from the web message storing unit 120, the application message storing unit 130, and the database message storing unit 140. Then, the transaction analyzing unit 160 carries out transaction analysis.

Next described is message information collected by the message collecting unit 110 with reference to FIGS. 6 to 8. FIG. 6 illustrates an example of a data structure of a web message storing unit. The web message storing unit 120 includes therein a web message management table 121. The web message management table 121 includes columns for time stamp, type, uniform resource locator (URL), session identifier (ID), and transaction identifier. Information of a web message is entered in each row of the web message management table 121.

In the time stamp column, each entry contains the time (time stamp) at which the capture apparatus 44 acquired a corresponding web message. The time stamp is set based on the internal clock of the capture apparatus 44. In the type column, each entry contains the type of a corresponding web message. Examples of the type include a request message and a response message. According to the example of FIG. 6, 'req' is set in the type column in the case of a request message, and 'res' is set therein in the case of a response message. In the URL column, each entry contains the URL of an access destination set in a corresponding request message.

In the session identifier column, each entry contains the identifier uniquely identifying a communication session (session identifier) established between one of the terminals 31 to 33 and the web server 41. Paired request and response messages (message pair) having the same session identifier indicate the start time and end time, respectively, of a process executed in response to the request message. In the transaction identifier column, each entry contains the identifier uniquely identifying a transaction (transaction identifier) executed in response to a request from one of the terminals 31 to 33. The transaction identifier indicated in the response message of each message pair uniquely indicates a transaction corresponding to the message pair.

FIG. 7 illustrates an example of a data structure of an application message storing unit. The application message storing unit 130 includes therein an application message management table 131. The application message management table 131 includes columns for start/end, transaction identifier, time stamp, class name, and method name. Information of an application message is entered in each row of the application message management table 131.

In the start/end column, each entry contains information indicating whether the application server 42 received a request message having triggered the start of a process or transmitted a response message indicating a processing result upon completion of a process. In the case where the application server 42 received a request message, a flag 'S' indicating the start of a process is entered. In the case where the application server 42 transmitted a response message, a flag 'E' indicating the end of a process is entered.

In the transaction identifier column, each entry contains the transaction identifier of a transaction corresponding to a process executed by the application server 42. In the time stamp column, each entry contains the time at which the application server 42 received or transmitted a corresponding message.

In the class name column, each entry contains the class name of a corresponding process executed by the application server 42 as a part of transaction processing. In the method name column, each entry contains the method name of a corresponding process executed by the application server 42 as a part of transaction processing.

Note that the same transaction identifier, class name, and method name are entered for application messages individually indicating the start and end of a specific process executed by the application server 42. Therefore, each message pair is composed of a start (S) application message and an end (E) application message having the same transaction identifier, class name, and method name. Based on individual time stamps of each message pair, the execution period of a process corresponding to the transaction identifier is obtained.

In the example of FIG. 7, there are a plurality of start application messages having the same transaction identifier. This is because the web server 41 transmitted a plurality of request messages to the application server 42 during a single transaction.

FIG. 8 illustrates an example of a data structure of a database message storing unit. The database message storing unit 140 includes therein a database message management table 141. The database message management table 141 includes columns for identifier, time stamp, transaction identifier, type+protocol, and SQL command/data. Information of a database message is entered in each row of the database message management table 141.

In the identifier column, each entry contains the identifier added to a corresponding message exchanged in a session between the application server 42 and the database server 43. The same identifier is added to a request message transmitted to the database server 43 from the application server 42 and a response message transmitted from the database server 43 in response to the request message. In the time stamp column, each entry contains the time stamp added to a corresponding database message by the capture apparatus 45.

In the transaction identifier column, each entry contains the transaction identifier added to a corresponding database message. In the type+protocol column, each entry contains the type of a corresponding database message, i.e. either a request message or a response message, and a protocol of the database message. In the SQL command/data column, each entry contains the SQL command and data included in a corresponding database message.

Each message pair is formed by associating a request message and a response message having the same identifier in the database message management table 141.

Figure 9:
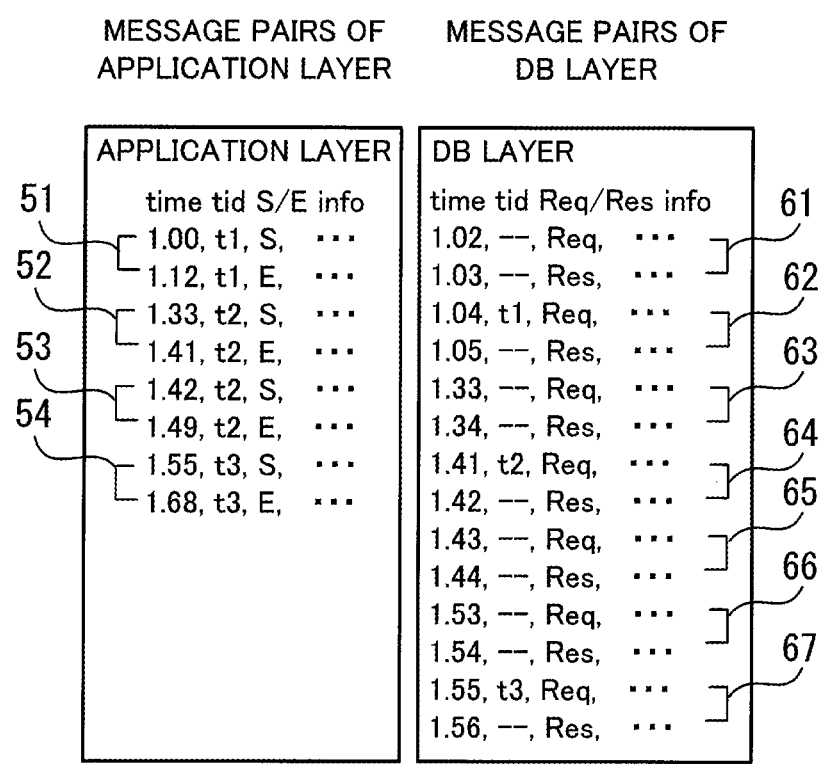
FIG. 9 illustrates an example of message pairs of an application layer and a database layer.

Next described is an example of calculating a correction value for time correction between application messages and database messages. FIG. 9 illustrates an example of message pairs of an application layer and a database layer. In FIG. 9, application messages and database messages are presented in a simplified manner. As for the application messages in FIG. 9, the time indicated by time stamps is denoted as 'time', the transaction identifier is denoted as 'tid', the start/end flag is denoted as 'S/E', and other information is denoted as 'info'. As for the database messages, the time indicated by time stamps is denoted as 'time', the transaction identifier is denoted as 'tid', the type is denoted as 'Req/Res', and other information is denoted as 'info'. 'Req' and 'Res' of the type represent a request message and a response message, respectively. Each of message pairs 51 to 54 of the application layer is given a transaction identifier.

According to the example of FIG. 9, the four message pairs 51 to 54 composed of application messages and seven message pairs 61 to 67 composed of database messages are generated. A transaction identifier is given, among the database message pairs 61 to 67, only to each of the request messages of the three message pairs 62, 64, and 67.

Figure 10:
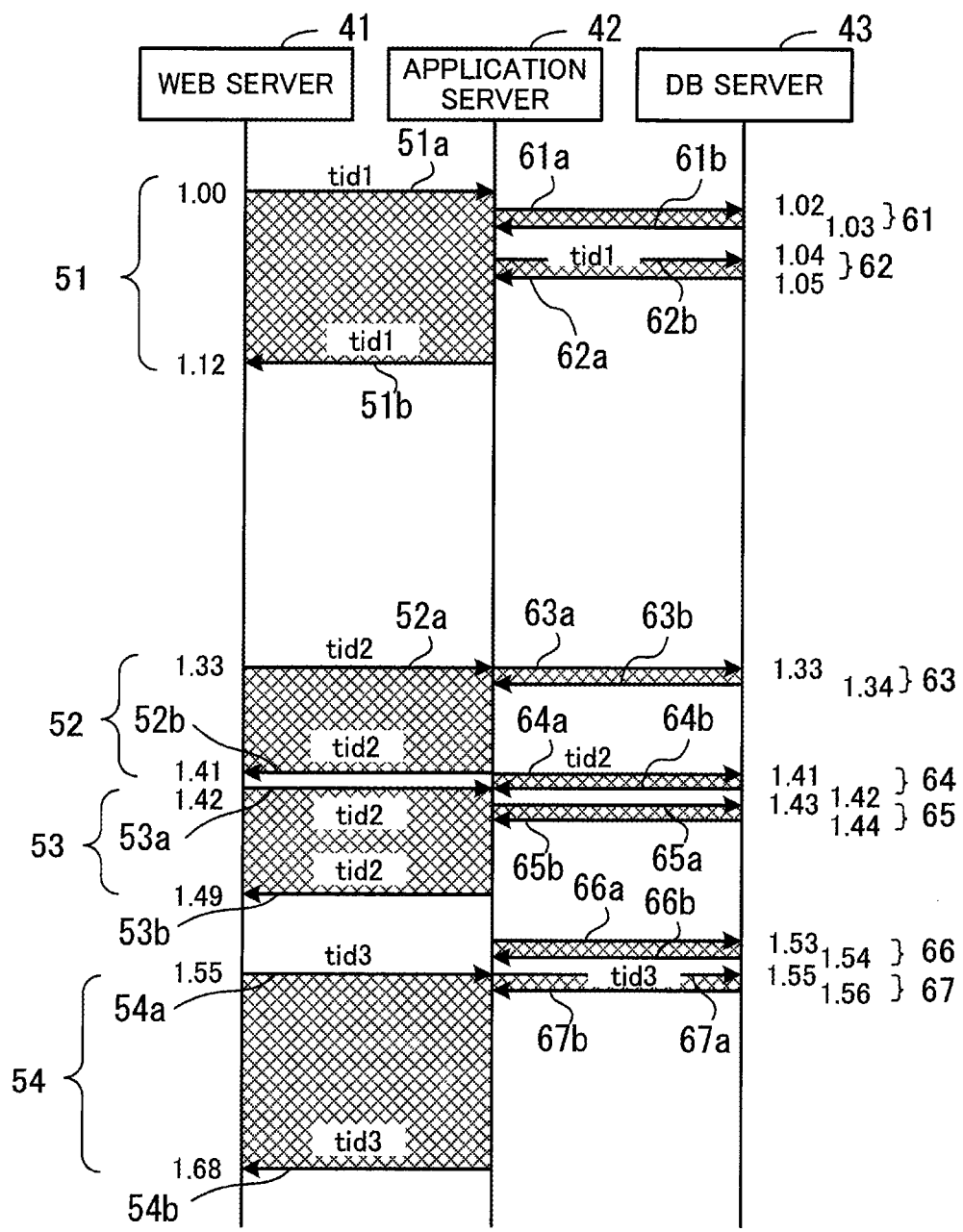
FIG. 10 illustrates an example of message transmission timing before time correction.

Arranging the individual messages of such message pairs in chronological order according to the time indicated by their time stamps makes the temporal relationship of the messages clear. FIG. 10 illustrates an example of message transmission timing before time correction. In FIG. 10, the messages of the message pairs 51 to 54 and 61 to 67 of FIG. 9 are placed in chronological order. Execution periods of processes executed by the application server 42 and the database server 43 are determined as follows, based on the uncorrected time added to the individual messages.

Each of the message pairs 51 to 54 of the application layer indicates a period of transaction processing corresponding to a transaction identifier, executed by the application server 42. Based on a request message 51*a* and a response message 51*b* of the message pair 51, the execution period of a process with the transaction identifier tid1 is found to be between time 1.00 and time 1.12. Based on a request message 52*a* and a response message 52*b* of the message pair 52, the execution period of a first process with the transaction identifier tid2 is found to be between time 1.33 and time 1.41. Based on a request message 53*a* and a response message 53*b* of the message pair 53, the execution period of a second process with the transaction identifier tid2 is found to be between time 1.42 and time 1.49. Based on a request message 54*a* and a response message 54*b* of the message pair 54, the execution period of a process with the transaction identifier tid3 is found to be between time 1.55 and time 1.68.

Each of the message pairs 61 to 67 of the database layer indicates a period of at least part of transaction processing corresponding to a transaction identifier, executed by the database server 43. Based on a request message 62*a* and a response message 62*b* of the message pair 62, the execution period of a process corresponding to the transaction identifier tid1 is found to be between time 1.04 and time 1.05. Based on a request message 64*a* and a response message 64*b* of the message pair 64, the execution period of a process with the transaction identifier tid2 is found to be between time 1.41 and time 1.42. Based on a request message 67*a* and a response message 67*b* of the message pair 67, the execution period of a process with the transaction identifier tid3 is found to be between time 1.55 and time 1.56.

In addition, transaction identifiers are not given to some message pairs 61, 63, 65, and 66 of the database layer, and it therefore remains unknown to which transaction each of the processes belongs. Based on a request message 61*a* and a response message 61*b* of the message pair 61, a process belonging to one of the transactions is found to have taken place between time 1.02 and time 1.03. Based on a request message 63*a* and a response message 63*b* of the message pair 63, a process belonging to one of the transactions is found to have taken place between time 1.33 and time 1.34. Based on a request message 65*a* and a response message 65*b* of the message pair 65, a process belonging to one of the transactions is found to have taken place between time 1.43 and time 1.44. Based on a request message 66*a* and a response message 66*b* of the message pair 66, a process belonging to one of the transactions is found to have taken place between time 1.53 and time 1.54.

Now in the execution of actual transaction processing, the application server 42 executing a process calls the database server 43 for a process (i.e., transmits a request message). Subsequently, the database server 43 after completing the execution of the process returns a response to the application server 42 (transmits a response message). Therefore, after time correction is properly made, the following two conditions are met between the message pairs 51 to 54 of the application server 42 and the message pairs 61 to 67 of the database server 43.

A first condition is that the execution period of a process with a transaction identifier, executed by the database server 43, is contained in the execution period of a process with the same transaction identifier, executed by the application server 42. That is, the process of the database server 43 starts at or after the start time of the process of the application server 42, having the same transaction identifier. In addition, the process of the database server 43 ends at or before the end time of the process of the application server 42, having the same transaction identifier. In the second embodiment, a message pair of a lower-level layer (the database layer in the example of FIG. 10) satisfying the inclusion relation between the processes with the same transaction identifier is referred to as the 'transaction identifier-matched message pair'. In addition, the proportion of transaction identifier-matched message pairs to all lower-level layer message pairs with transaction identifiers is referred to as the 'matching rate'.

A second condition is that the execution period of a process with no transaction identifier, executed by the database server 43, is contained in the execution period of one of processes executed by the application server 42. That is, with respect to each process of the database server 43, there is a process of the application server 42, having started at or before the start time of the process of the database server 43 and having ended at or after the end time of the process of the database server 43. In the second embodiment, a message pair of a lower-level layer (the database layer in the example of FIG. 10) satisfying such an inclusion relation not bound by a transaction identifier is referred to as the 'covered message pair'. In addition, the proportion of covered message pairs to all lower-level layer message pairs is referred to as the 'cover rate'.

According to the example of FIG. 10, among the three database-layer message pairs 62, 64, and 67 with a transaction identifier, one message pair 64 is not a transaction identifier-matched message pair. Therefore, the matching rate is 66.7%. In addition, among the seven database-layer message pairs 61 to 67, two message pairs 64 and 66 are not covered by calling processes. Therefore, the cover rate is 71.4%.

Thus, without time correction, neither the matching rate nor the cover rate becomes 100%. In the actual transactions, the individual messages have been transmitted in such an order that both the matching rate and the cover rate become 100%. In view of this, the time correcting unit 150 obtains a correction value allowing both the matching rate and the cover rate to be 100%.

Note however that such a correction value allowing both the matching rate and the cover rate to be 100% may not be found in the case where the number of message pairs to which the same single correction value is applied is excessively large. Next described are relationships between the number of message pairs and the matching rate and cover rate with respect to each prospective correction value, with reference to FIGS. 11 to 13.

Figure 11:
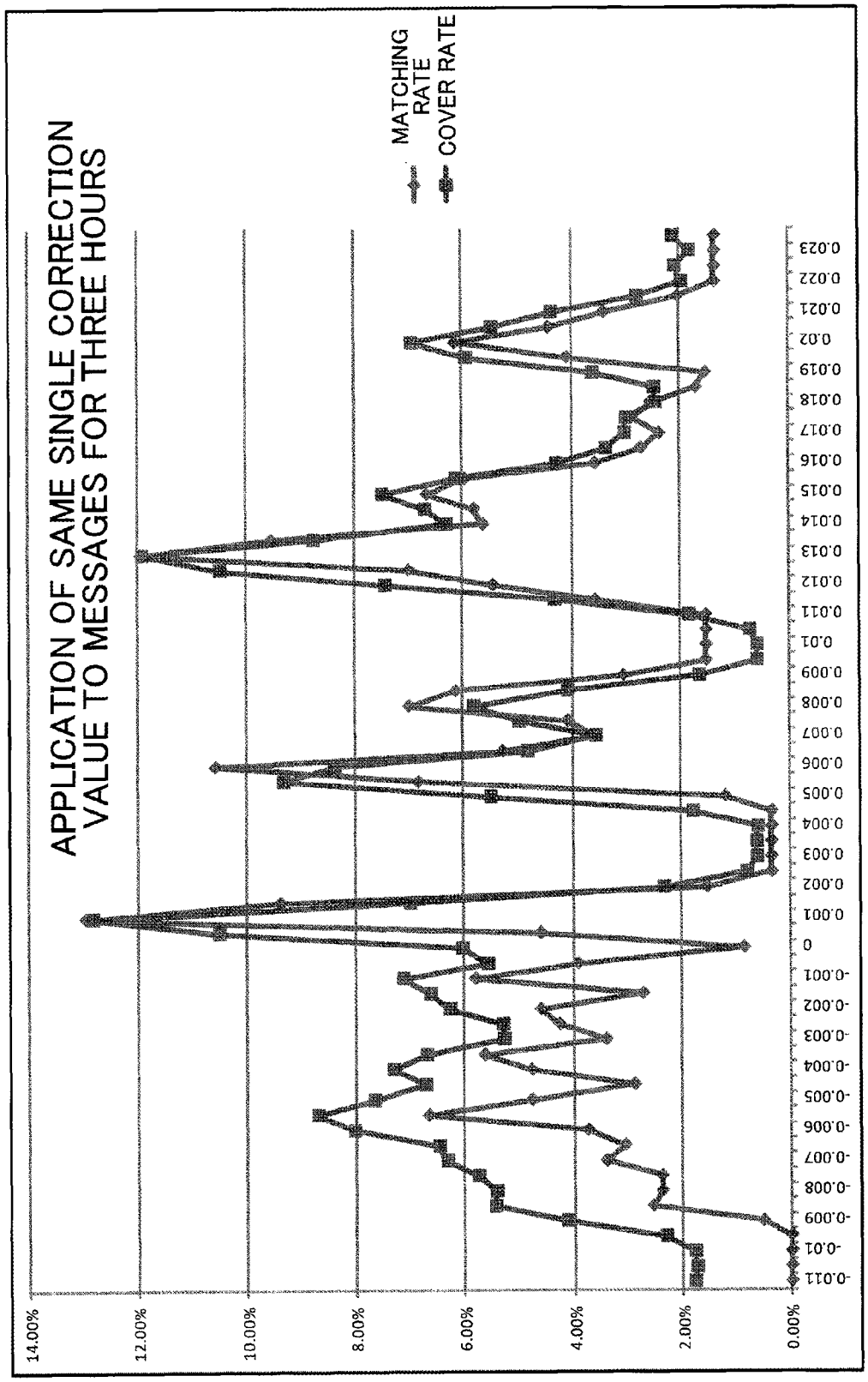
FIG. 11 illustrates an example of transitions of a matching rate and a cover rate according to prospective correction values in a case of applying the same single correction value to messages for three hours.

FIG. 11 illustrates an example of transitions of a matching rate and a cover rate according to prospective correction values in the case of applying the same single correction value to messages for three hours. In FIG. 11, the horizontal axis represents a series of prospective correction values and the vertical axis represents the matching rate and the cover rate. As illustrated in FIG. 11, correcting the time of the messages for three hours by using the same single prospective correction value produces both a matching rate and a cover rate of as low as about 13% at most.

Figure 12:
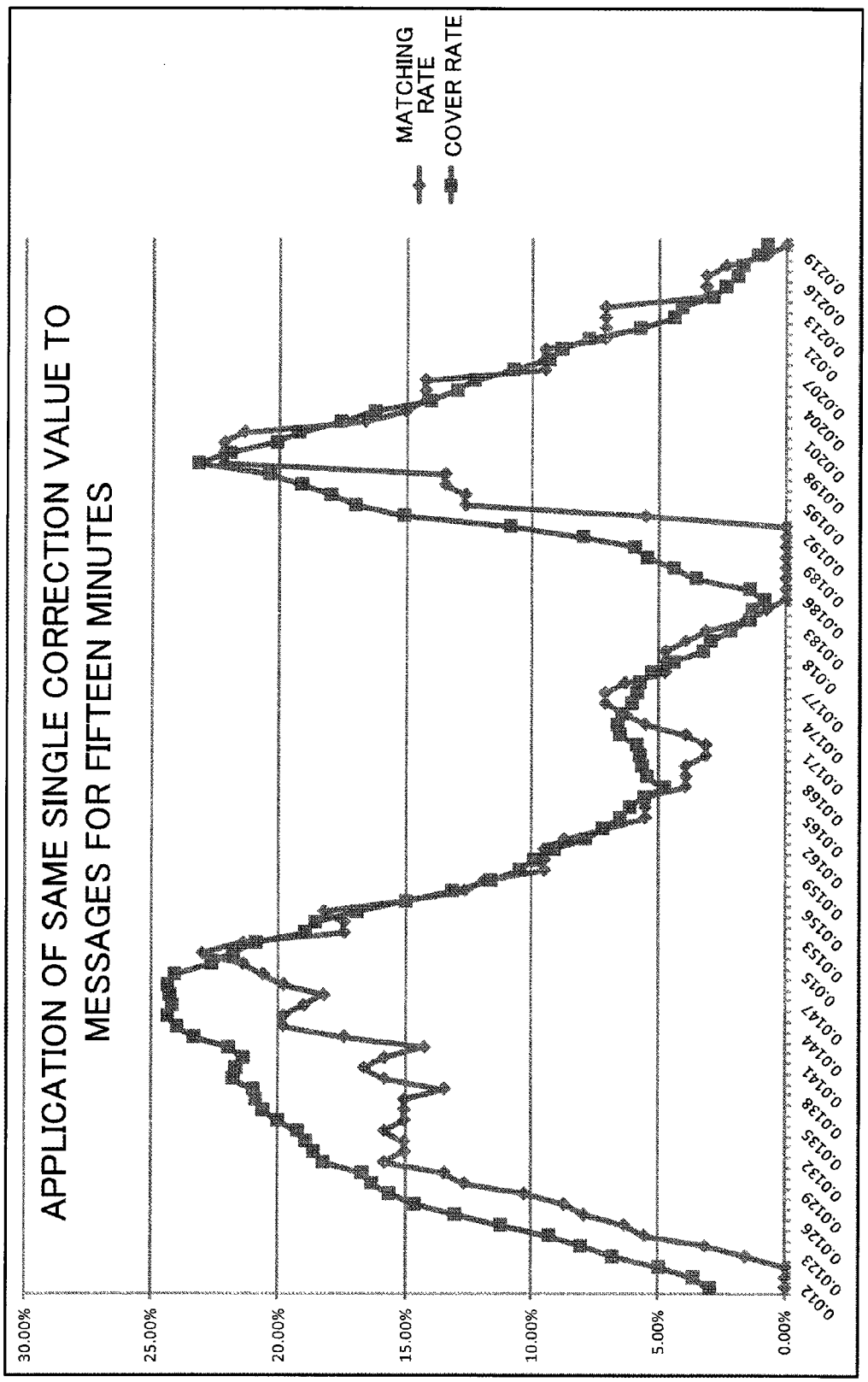
FIG. 12 illustrates an example of transitions of the matching rate and the cover rate according to prospective correction values in the case of applying the same single correction value to messages for fifteen minutes.

FIG. 12 illustrates an example of transitions of a matching rate and a cover rate according to prospective correction values in the case of applying the same single correction value to messages for fifteen minutes. In FIG. 12, the horizontal axis represents a series of prospective correction values and the vertical axis represents the matching rate and the cover rate. Note that the graph of FIG. 12 presents the matching rate and the cover rate calculated based on messages for the first fifteen minutes out of the three-hour messages used to create the graph of FIG. 11. As illustrated in FIG. 12, correcting the time of the messages for fifteen minutes by using the same single prospective correction value produces an increased matching rate of about 23% at most and an increased cover rate of about 24% at most. Nonetheless, both the matching rate and the cover rate fall short of 100%.

Figure 13:
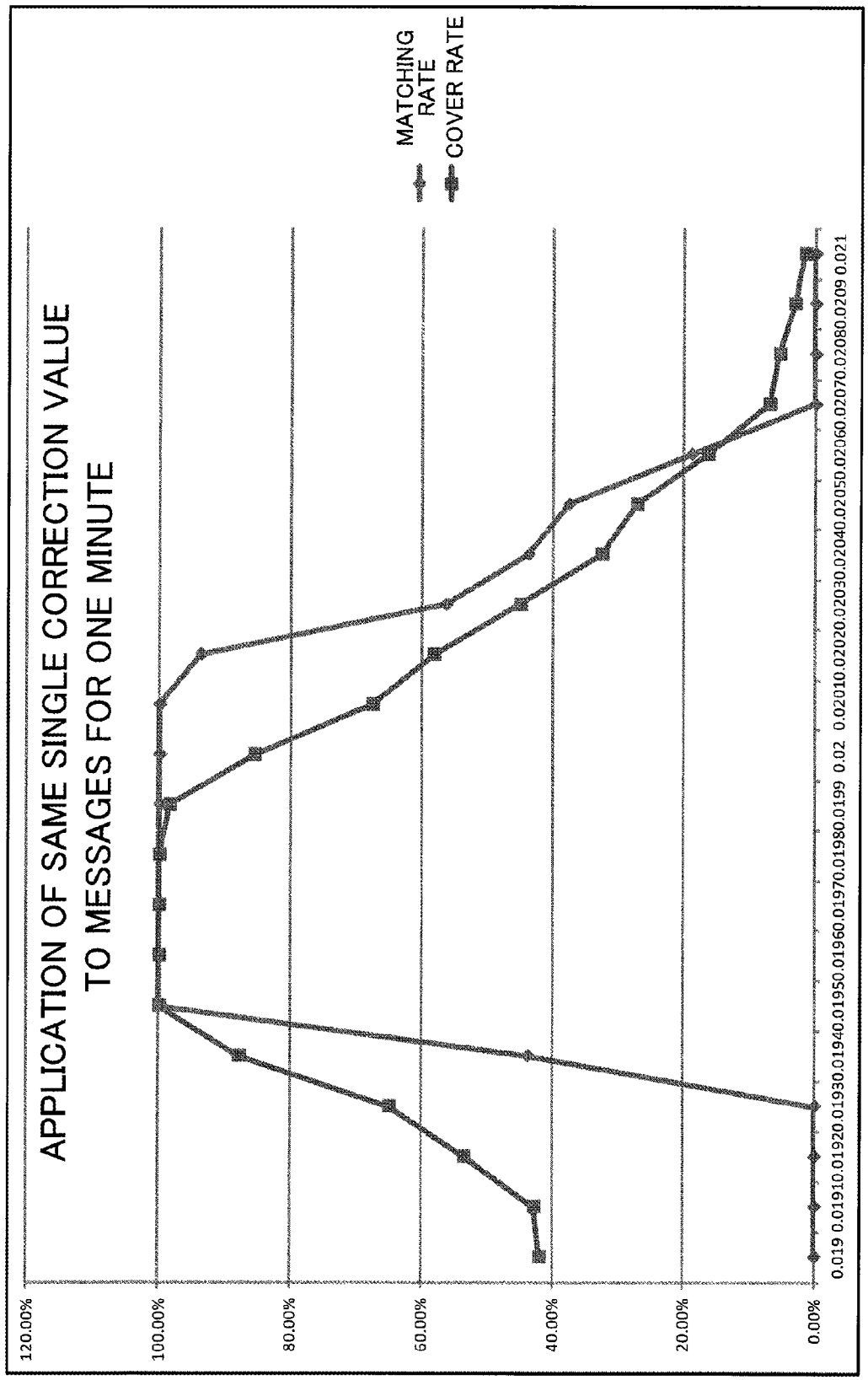
FIG. 13 illustrates an example of transitions of the matching rate and the cover rate according to prospective correction values in the case of applying the same single correction value to messages for one minute.

FIG. 13 illustrates an example of transitions of a matching rate and a cover rate according to prospective correction values in the case of applying the same single correction value to messages for one minute. In FIG. 13, the horizontal axis represents a series of prospective correction values and the vertical axis represents the matching rate and the cover rate. Note that the graph of FIG. 13 presents the matching rate and the cover rate calculated based on messages for the first one minute out of the three-hour messages used to create the graph of FIG. 11.

As illustrated in FIGS. 11 to 13, a prospective correction value allowing both the matching rate and the cover rate to be 100% may not be found in the case where the number of messages to which the same single correction value is applied is large. In view of this, the second embodiment limits the temporal range of messages to which the same single prospective correction value is applied. In this case, however, if the number of messages to which the same single correction value is applied is too small, there is a range of prospective correction values allowing both the matching rate and the cover rate to be 100%. According to the example of FIG. 13, in a range of prospective correction values from 0.0195 seconds to 0.0198 seconds, both the matching rate and the cover rate become 100%. In the case where there is an excessively wide range of prospective correction values allowing both the matching rate and the cover rate to be 100%, it is difficult to determine which prospective correction value is appropriate to use as a correction value. In view of the problems above, the second embodiment determines more messages enabling acquisition of a correction value allowing both the matching rate and the cover rate to be 100%, and applies the same single correction value to the determined messages.

Next described are methods for determining a time correction range of each message pair of a lower-level layer (the database layer in the examples of FIGS. 9 and 10). The time correction range of a message pair changes depending on whether the message pair has a transaction identifier. First, the time correction range of a message pair with a transaction identifier is described. As for a message pair with a transaction identifier, time correction is allowed as long as the execution period of a process corresponding to the message pair after the time correction is contained in the execution period of a process corresponding to a higher-level layer message pair with the same transaction identifier.

Technically, an application-layer process and a database-layer process called by the application-layer process do not start or end at the exact same time, and there is a little time difference in the start time or the end time between the two processes. However, for example, if the time difference is extremely small, it may appear when observed externally as if the higher-level layer process and the lower-level layer process had started or ended at the same time. Therefore, in the second embodiment, the time correction range is defined as a closed interval. That is, it is allowed that the start time of a higher-level layer process (the time of a request message) is the same as that of a lower-level layer process called by the higher-level layer process (the time of a request message). In addition, it is also allowed that the end time of a higher-level layer process (the time of a response message) is the same as that of a lower-level layer process called by the higher-level layer process (the time of a response message).

Note however that the time correction range may be defined as an open interval, for example, when the time precision of time stamps is very high, that is, when it is possible to prevent the start time or end time of the higher-level layer process and that of the lower-level layer process from being the same even when observed externally.

Figure 14:
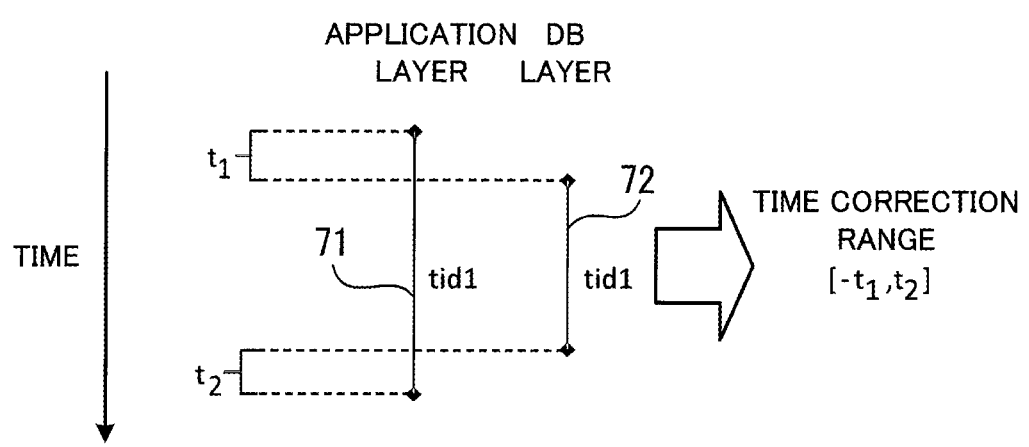
FIG. 14 illustrates a first example of a time correction range of a message pair with a transaction identifier.

FIG. 14 illustrates a first example of a time correction range of a message pair with a transaction identifier. The example of FIG. 14 represents a case in which the execution period of a process 72 corresponding to a database-layer message pair is contained in the execution period of a process 71 corresponding to an application-layer message pair having the same transaction identifier as the database-layer message pair. In this case, it is possible to make a correction such that a period of time shorter than or equal to a difference $t_1$ between the start time of the process 71 and that of the process 72 is subtracted from the time of the messages corresponding to the process 72. In addition, it is possible to make a correction such that a period of time shorter than or equal to a difference $t_2$ between the end time of the process 71 and that of the process 72 is added to the time of the messages of the process 72. That is, as long as the correction value is within the range of $[-t_1, t_2]$, the execution period of the process 72 after correction of the time of the messages corresponding to the process 72 is contained in the execution period of the process 71.

Note that, in the second embodiment, the correction value is defined as a closed interval, and the time correction range therefore includes $-t_1$ and $t_2$. In the case where the time correction range is defined as an open interval, the time correction range is denoted as $(-t_1, t_2)$ and does not include neither $-t_1$ nor $t_2$.

Figure 15:
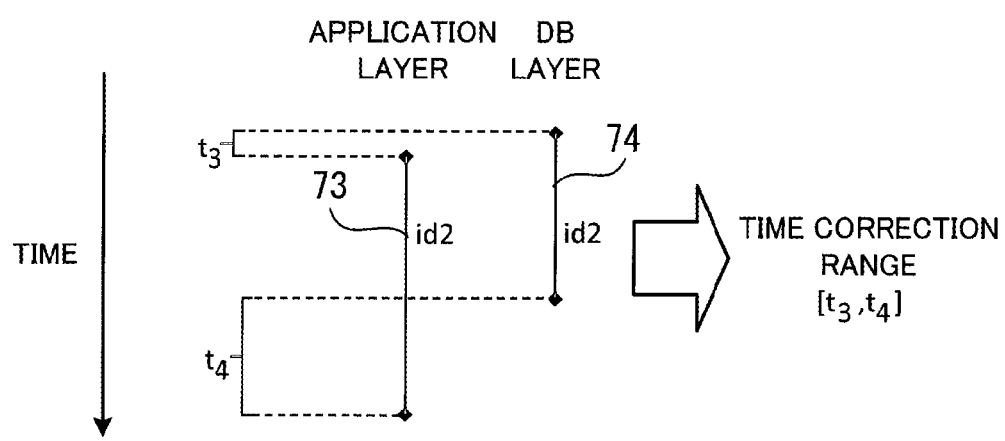
FIG. 15 illustrates a second example of the time correction range of a message pair with a transaction identifier.

FIG. 15 illustrates a second example of the time correction range of a message pair with a transaction identifier. The example of FIG. 15 represents a case in which the execution period of a process 74 corresponding to a database-layer message pair is not contained in the execution period of a process 73 corresponding to an application-layer message pair having the same transaction identifier as the database-layer message pair. In this case, it is possible to make a correction such that a period of time longer than or equal to a difference $t_3$ between the start time of the process 73 and that of the process 74 is added to the time of the messages corresponding to the process 74. Note however that the add time needs to be a period of time shorter than or equal to a difference $t_4$ between the end time of the process 73 and that of the process 74. That is, as long as the correction value is within the range of $[t_3, t_4]$, the execution period of the process 74 after correction of the time of the messages corresponding to the process 74 is contained in the execution period of the process 73.

Next, a time correction range of a message pair with no transaction identifier added is described. As for a message pair with no transaction identifier, time correction is allowed as long as the execution period of a process corresponding to the message pair after time correction is contained in the execution period of a process corresponding to one of higher-level layer message pairs.

Figure 16:
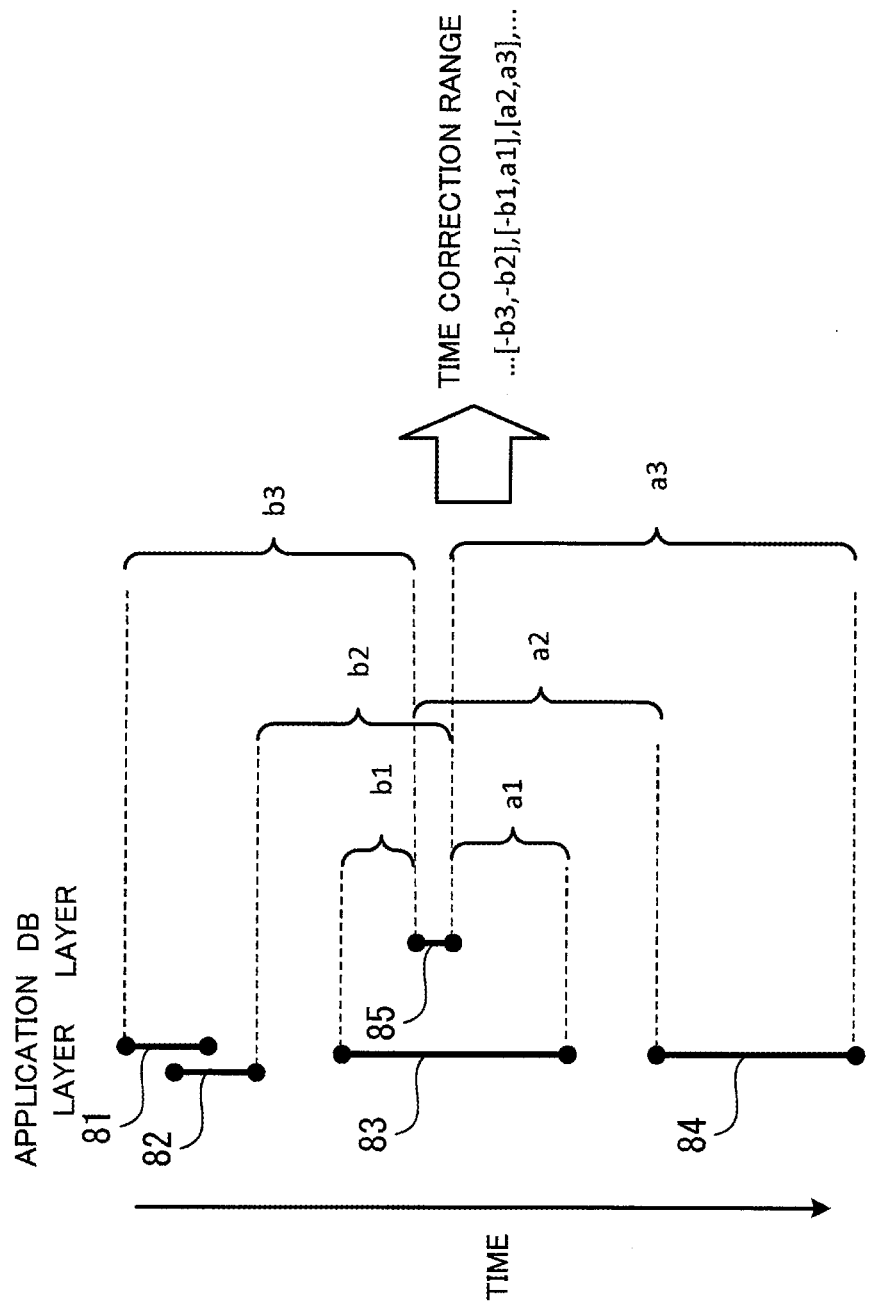
FIG. 16 illustrates an example of the time correction range of a message pair with no transaction identifier.

FIG. 16 illustrates an example of a time correction range of a message pair with no transaction identifier. The execution period of a process 85 corresponding to a database-layer message pair with no transaction identifier is compared with the execution period of each of processes 81 to 84 corresponding to application-layer message pairs. Then, collective ranges of the execution periods of all the comparison target application-layer processes 81 to 84 are determined as the time correction range of the message pair corresponding to the database-layer process 85.

According to the example of FIG. 16, one of the collective ranges extends from a point obtained by subtracting a difference b3 between the start time of the process 81 and that of the process 85 from the start time of the process 85 to a point obtained by subtracting a difference b2 between the end time of the process 82 and that of the process 85 from the end time of the process 85. This range is denoted as [−b3, −b2]. Another one of the collective ranges extends from a point obtained by subtracting a difference b1 between the start time of the process 83 and that of the process 85 from the start time of the process 85 to a point obtained by adding a difference a1 between the end time of the process 85 and that of the process 83 to the end time of the process 85. This range is denoted as [−b1, a1]. Yet another one of the collective ranges extends from a point obtained by adding a difference a2 between the start time of the process 85 and that of the process 84 to the start time of the process 85 to a point obtained by adding a difference a3 between the end time of the process 85 and that of the process 84 to the end time of the process 85. This range is denoted as [a2, a3]. Then, the logical OR of these ranges is the time correction range of the message pair composed of the request and response messages of the process 85.

In the above-described manner, the time correction range is determined with respect to each message pair. Subsequently, when determining a time correction range based on a plurality of message pairs, the time correcting unit 150 designates an overlap of time correction ranges of the individual message pairs as the time correction range of the message pairs. For example, the time correcting unit 150 sequentially selects a message pair in a lower-level layer (for example, the database layer) in chronological order, and updates the time correction range for each selection.

Figure 17:
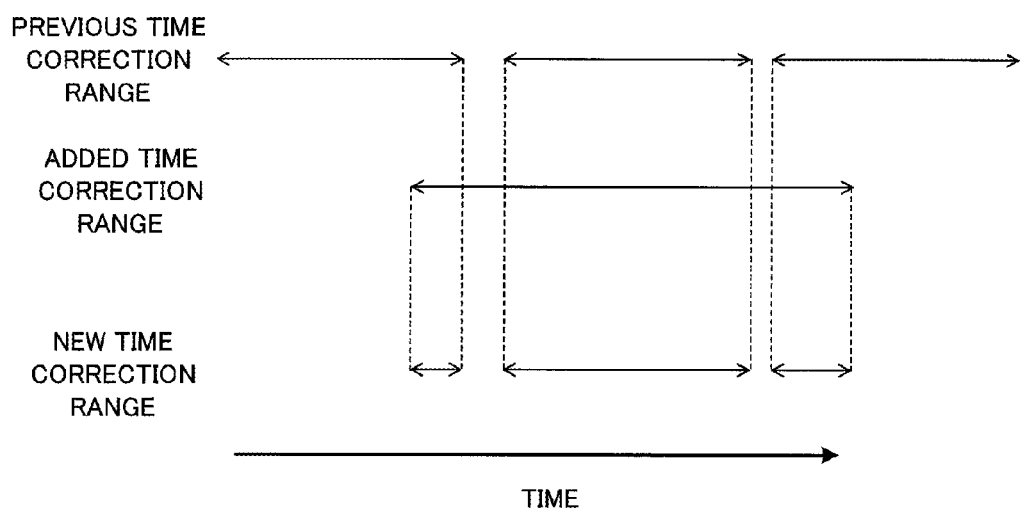
FIG. 17 illustrates an example of updating the time correction range.

FIG. 17 illustrates an example of updating a time correction range. FIG. 17 represents a previous time correction range, an added time correction range, and a new time correction range. The previous time correction range is determined based on a previously selected message pair. The added time correction range is based on a newly selected message pair. The new time correction range is determined based on the previously and newly selected message pairs. As illustrated in FIG. 17, the new time correction range corresponds to overlaps between the previous time correction range and the added time correction range. The time correction range is gradually narrowed down with each update in the above-described manner.

Note that, according to the second embodiment, determination of the time correction range of a plurality of message pairs starts with obtaining a time correction range based on a message pair with a transaction identifier. Subsequently, the obtained time correction range is continuously updated with the time correction range of each sequentially selected message pair. Obtaining the initial time correction range based on a message pair with a transaction identifier improves processing efficiency compared to obtaining the initial time correction range based on a message pair with no transaction identifier. That is, when a message pair with no transaction identifier is used in finding a time correction range, the processing amount is less if there is already an existing time correction range that places range limits, compared to the case of generating an initial time correction range based on the message pair with no transaction identifier.

Figure 18:
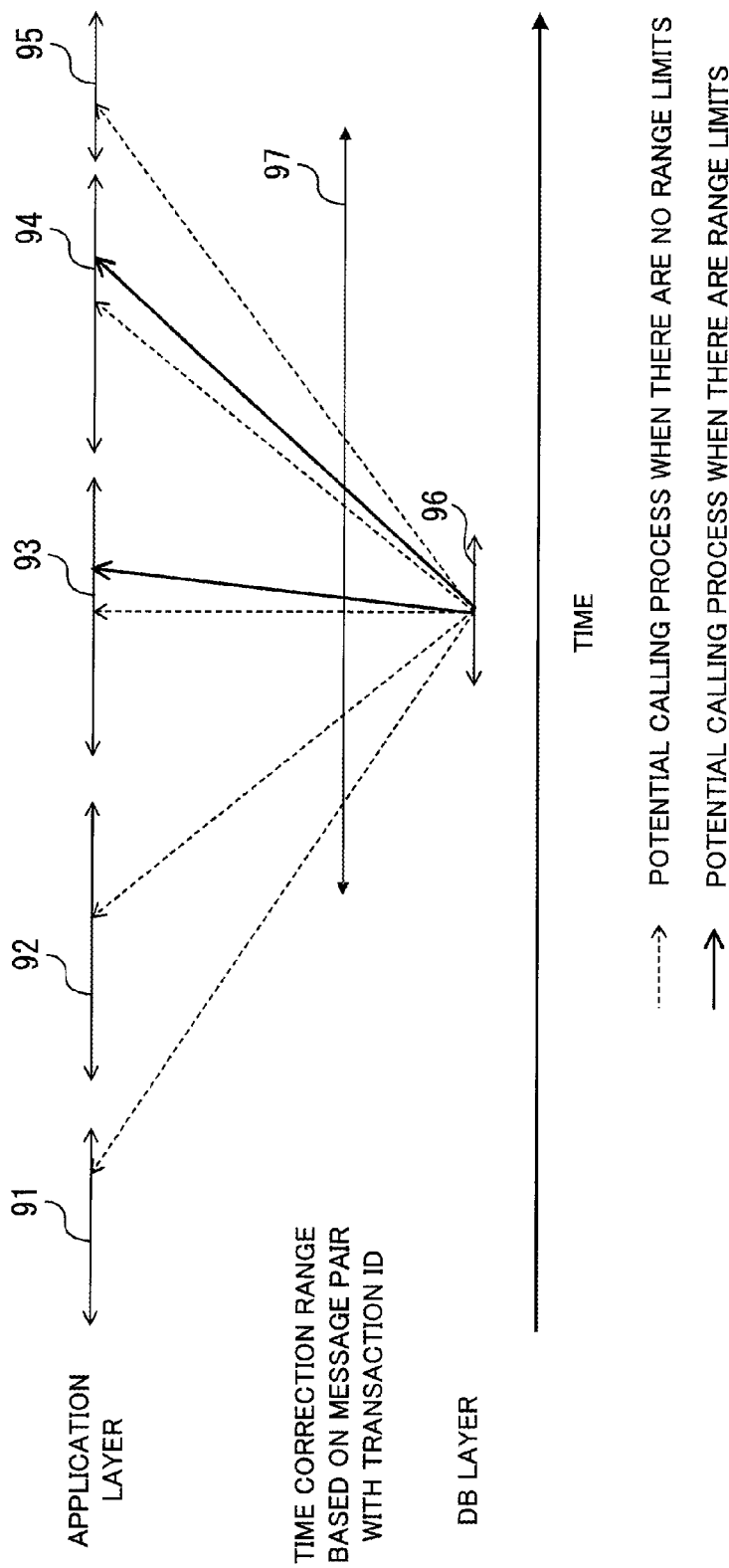
FIG. 18 illustrates a difference in the amount of processing due to whether there are temporal limits for the time correction range.

FIG. 18 illustrates a difference in the amount of processing due to whether there are temporal limits for a time correction range. FIG. 18 depicts the execution period of a process 96 corresponding to a selected database-layer message pair and the execution periods of processes 91 to 95 individually corresponding to application-layer message pairs. FIG. 18 also depicts a time correction range 97 obtained based on a message pair with a transaction identifier.

Assuming here that the time correction range 97 has yet to be determined and there are therefore no range limits at the time of determining a time correction range of the selected message pair, any of the application-layer processes 91 to 95 is a potential calling process of the database-layer process 96. Therefore, in order to determine the time correction range of the message pair corresponding to the database-layer process 96, the execution period of the database-layer process 96 is compared with the execution period of each of the five application-layer processes 91 to 95.

On the other hand, assuming that the time correction range 97 has been determined first, the time correction range of the selected message pair is bound by the time correction range 97. In this case, only either one of the processes 93 and 94 whose execution periods are contained in the time correction range 97 could be a calling process of the database-layer process 96. Therefore, in order to determine the time correction range of the message pair corresponding to the database-layer process 96, the execution period of the database-layer process 96 is compared with the execution period of each of the two application-layer processes 93 to 94.

In the above-described manner, by determining first the time correction range 97 based on a message pair with a transaction identifier, a smaller number of processes need to be compared at the time of determining the time correction range of a message pair with no transaction identifier, thus improving processing efficiency. That is, in the case where there are no range limits imposed by a time correction range obtained based on a message pair with a transaction identifier, higher-level processes become potential calling processes of a lower-level process, no matter how large the correction displacement of the execution period of the lower-level process is, as long as the inclusion relation between each of the higher-level processes and the lower-level process is satisfied. Thus, a large number of higher-level processes are found to be the potential calling processes, and it is therefore difficult to obtain a correction value efficiently. On the other hand, in the case where there are range limits imposed by a time correction range obtained based on a message pair with a transaction identifier, only a limited number of higher-level processes are found to be potential calling processes, facilitating efficient search for a time correction range. In view of this, according to the second embodiment, the time correction range of a message pair with a transaction identifier is determined first, prior to determination of the time correction range based on a message pair with no transaction identifier. This allows consistently efficient processing.

Figure 19:
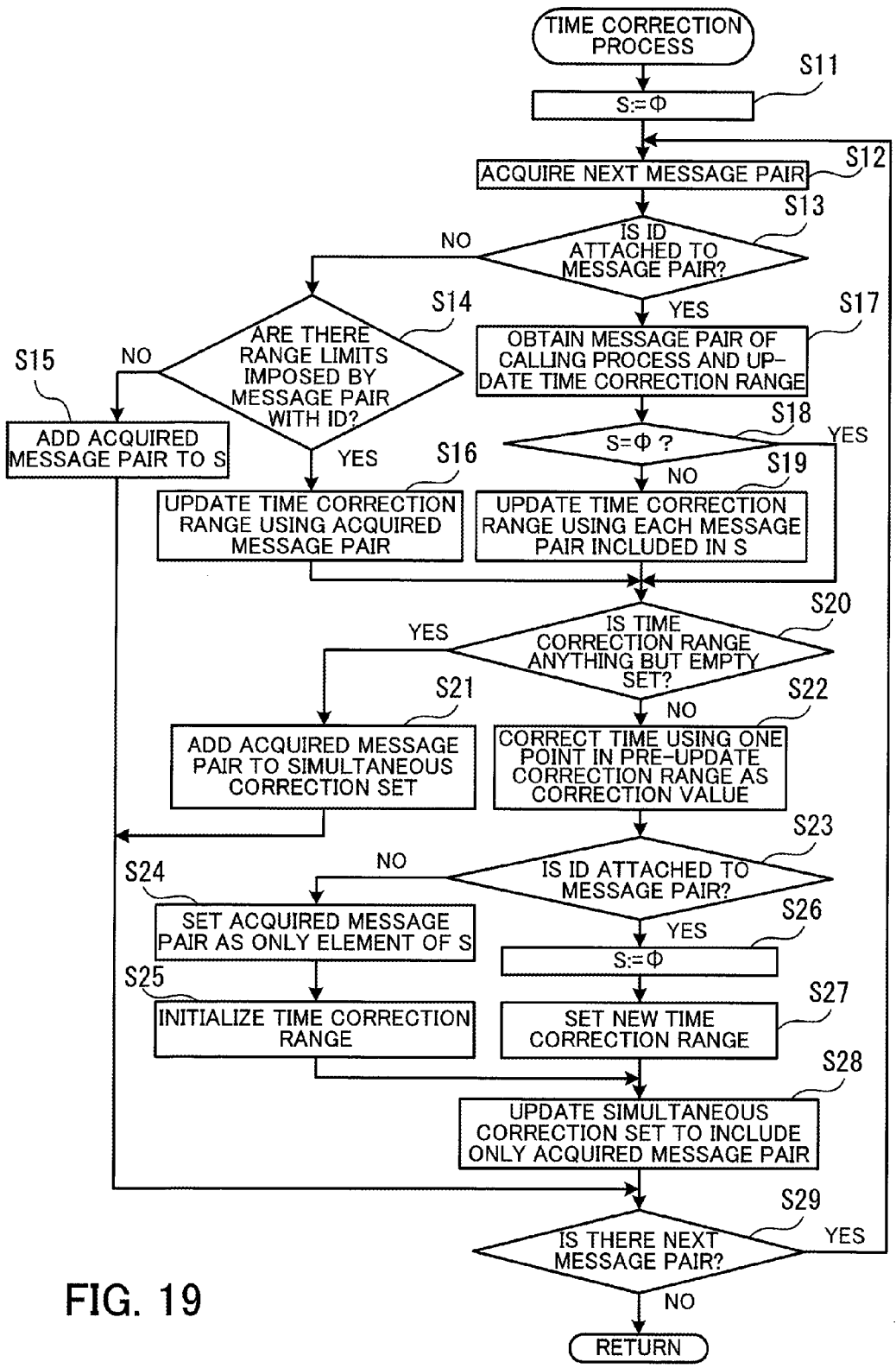
FIG. 19 is a flowchart illustrating a procedure of a time correction process.

Next described is a procedure of a time correction process. Note that, in the following description, the time correction process is explained using the case of correcting time differences between the application layer and the database layer as an example. FIG. 19 is a flowchart illustrating a procedure of a time correction process. The time correction process of FIG. 19 is described next according to the step numbers in the flowchart.

[Step S11] The time correcting unit 150 initializes a set S. For example, the time correcting unit 150 initializes the set S to be an empty set.

[Step S12] The time correcting unit 150 acquires one message pair of the lower-level layer (database layer). For example, the time correcting unit 150 acquires a message pair from the message pairs in the database message storing unit 140 in chronological order of time added to the request messages.

[Step S13] The time correcting unit 150 determines whether a transaction identifier is attached to the acquired message pair. For example, if at least one of the request message and the response message of the acquired message pair includes a transaction identifier, the time correcting unit 150 determines the transaction identifier as a transaction identifier attached to the message pair. If a transaction identifier is attached, the time correcting unit 150 advances the procedure to step S17. If not, the time correcting unit 150 advances the procedure to step S14.

[Step S14] The time correcting unit 150 determines whether there are existing range limits imposed by a time correction range obtained based on a message pair with a transaction identifier. In the case where a finite range has been set as a time correction range of a simultaneous correction set, the time correcting unit 150 determines that there are range limits. If there are range limits, the time correcting unit 150 advances the procedure to step S16. If not, the time correcting unit 150 advances the procedure to step S15.

[Step S15] When there are no range limits, the time correcting unit 150 adds the acquired message pair to the set S. Subsequently, the time correcting unit 150 advances the procedure to step S29.

[Step S16] When there are range limits, the time correcting unit 150 updates the time correction range of the simultaneous correction set based on the acquired message pair. For example, the time correcting unit 150 extracts, from among application-layer message pairs stored in the application message storing unit 130, a message pair such that the execution period of a corresponding process is contained in the time correction range of the simultaneous correction set. The time correcting unit 150 compares the execution period of the process corresponding to the extracted message pair and the execution period of a process corresponding to the message pair acquired in step S12, to thereby determine the time correction range of the acquired message pair. Then, the time correcting unit 150 sets, as a new time correction range of the simultaneous correction set, an overlapping range between the time correction range of the simultaneous correction set and the time correction range of the acquired message pair. Subsequently, the time correcting unit 150 advances the procedure to step S20.

[Step S17] When a transaction identifier is attached to the acquired message pair, the time correcting unit 150 obtains a message pair of the calling process and updates the time correction range of the simultaneous correction set. For example, the time correcting unit 150 extracts a message pair having the same transaction identifier as the acquired message pair from the application message storing unit 130. Next, the time correcting unit 150 compares the execution period of a process corresponding to the extracted message pair and that of the process corresponding to the message pair acquired in step S12, to thereby determine the time correction range of the acquired message pair. Then, the time correcting unit 150 sets, as a new time correction range of the simultaneous correction set, an overlapping range between the time correction range of the simultaneous correction set and the time correction range of the acquired message pair.

Note that when an overlapping range is not found between the time correction range of the simultaneous correction set and that of the acquired message pair, the time correction range of the simultaneous correction set becomes an empty set. When the time correction range of the simultaneous correction set is updated to an empty set, the time correcting unit 150 stores the pre-update time correction range in a memory such as the RAM 102.

[Step S18] The time correcting unit 150 determine whether the set S is an empty set. If the set S is an empty set, the time correcting unit 150 advances the procedure to step S20. If not, the time correcting unit 150 advances the procedure to step S19.

[Step S19] The time correcting unit 150 updates the time correction range of the simultaneous correction set using individual database-layer message pairs included in the set S. For example, the time correcting unit 150 selects message pairs included in the set S one by one. Next, the time correcting unit 150 extracts, from among application-layer message pairs stored in the application message storing unit 130, a message pair such that the execution period of a corresponding process is contained in the time correction range of the simultaneous correction set. The time correcting unit 150 compares the execution period of the process corresponding to the extracted message pair and the execution period of the process corresponding to the selected message pair, to thereby determine the time correction range of the selected message pair. Then, the time correcting unit 150 sets, as a new time correction range of the simultaneous correction set, an overlapping range between the time correction range of the simultaneous correction set and the time correction range of the selected message pair.

Note that when an overlapping range is not found between the time correction range of the simultaneous correction set and that of the selected message pair, the time correction range of the simultaneous correction set becomes an empty set. When the time correction range of the simultaneous correction set is updated to an empty set, the time correcting unit 150 stores the pre-update time correction range to a memory such as the RAM 102.

[Step S20] The time correcting unit 150 determines whether the time correction range of the simultaneous correction set is an empty set. If the time correction range of the simultaneous correction set is not an empty set, the time correcting unit 150 advances the procedure to step S21. If the time correction range of the simultaneous correction set is an empty set, the time correcting unit 150 advances the procedure to step S22.

[Step S21] When the time correction range of the simultaneous correction set is not an empty set, the time correcting unit 150 adds the acquired message pair to the simultaneous correction set. Subsequently, the time correcting unit 150 advances the procedure to step S29.

[Step S22] The time correcting unit 150 determines one point in the time correction range of the simultaneous correction set before the update in step S16 or S19 as a time correction value for message pairs included in the current simultaneous correction set. Then, the time correcting unit 150 corrects the time of the time stamp of each of the message pairs included in the simultaneous correction set using the determined correction value. For example, the time correcting unit 150 uses, as the correction value, the median of the pre-update correction range of the simultaneous correction set. Alternatively, the time correcting unit 150 may use the smallest or the largest value of the pre-update time correction range of the simultaneous correction set as the correction value. Next, the time correcting unit 150 adds the correction value to the time of the time stamp of each of the message pairs included in the simultaneous correction set. Note that if the correction value is a negative value, the absolute value of the correction value is subtracted from the time of each message. Then, the time correcting unit 150 overwrites original message records in the database message storing unit 140 with records of messages of each message pair after the time correction.

[Step S23] The time correcting unit 150 determines whether a transaction identifier is attached to the acquired message pair. If a transaction identifier is attached, the time correcting unit 150 advances the procedure to step S26. If not, the time correcting unit 150 advances the procedure to step S24.

[Step S24] When a transaction identifier is not attached to the acquired message pair, the time correcting unit 150 sets the acquired message pair as an only element of the set S. For example, the time correcting unit 150 deletes all elements of the sets S and, then, adds the acquired message pair to the set S.

[Step S25] The time correcting unit 150 initializes the time correction range of the simultaneous correction set so as not to impose range limits. For example, the time correcting unit 150 sets an entire range (for example, from negative infinity to positive infinity) as the time correction range of the simultaneous correction set. Subsequently, the time correcting unit 150 advances the procedure to step S28.

[Step S26] When a transaction identifier is attached to the acquired message pair, the time correcting unit 150 updates the set S to an empty set.

[Step S27] Based on the process corresponding to the acquired message pair, the time correcting unit 150 sets a new time correction range of the simultaneous correction set. For example, the time correcting unit 150 extracts a message pair having the same transaction identifier as the acquired message pair from the application message storing unit 130. Next, the time correcting unit 150 compares the execution period of the process corresponding to the extracted message pair and that of the process corresponding to the message pair acquired in step S12, to thereby determine the time correction range of the acquired message pair. Then, the time correcting unit 150 sets the time correction range of the acquired message pair as a new time correction range of the simultaneous correction set.

[Step S28] The time correcting unit 150 updates the simultaneous correction set to include only the acquired message pair.

[Step S29] The time correcting unit 150 determines whether there is a next message pair. If there is a next message pair, the time correcting unit 150 advances the procedure to step S12. On the other hand, when all the message pairs in the database message storing unit 140 have undergone the procedure and there is therefore no more message pair left, the time correcting unit 150 ends the time correction process.

In the above-described manner, a correction value is determined for each simultaneous correction set. Note that, according to the example of FIG. 19, the time correction range of a lower-level layer message pair with a transaction identifier is determined first. Next, as for a prior message pair with no transaction identifier (message pair in the set S) for which prospective calling processes have yet to be determined, the time correction range is obtained. Subsequently, an intersection of the time correction range of the message pair with no transaction identifier and the time correction range determined first is designated as a new time correction range. At this point, such an intersection may not exist and, therefore, the time correction range may become an empty set. In this case, the number of request messages attached with a transaction identifier in the application server 42 is considered to be insufficient. Therefore, for example, an administrator sets the application server 42 to increase, among request messages addressed to the database server 43, the number of request messages attached with a transaction identifier. This allows the future transaction analysis to have an improved possibility of including message pairs with no transaction identifier into a set of messages to which the same single correction value as for message pairs with a transaction identifier is to be applied.

After update of the time correction range based on message pairs in the set S, message pairs following the first message pair with a transaction identifier are sequentially extracted in chronological order, and the time correction range is repeatedly updated by taking an intersection of the time correction range determined previously and the time correction range of the extracted message pair. In the case where no intersection is found, time correction is made, using the same single correction value, for message pairs extracted prior to the last extracted message pair. Then, the time correction process moves on to the determination of a new correction value, which starts with the last extracted message pair.

Thus, according to the second embodiment, a correction allowable range satisfying limits and a set of messages subject to correction using the same single correction value are progressively updated in the above-described manner, and time correction for all the messages in the set is executed when the limits are not met any longer. Therefore, the second embodiment eliminates the need for iteratively correcting a range again when the limits are not met and then checking whether the corrected range meets the limits. In addition, a correction value is determined based on an inclusion relation between message pairs with a transaction identifier, which eliminates the need for making an assumption on a specific pattern of time lags between the internal clocks. As a result, according to the second embodiment, it is possible to properly correct time differences even when there are messages with no transaction identifier or when the time differences vary randomly.

According to the second embodiment, one point in a range common to all the time correction ranges of message pairs included in a single simultaneous correction set is designated as a time correction value to be applied to messages making up the message pairs. That is, when the time of each message of the message pairs included in the simultaneous correction set is corrected using the determined correction value, both the matching rate and the cover rate after the correction become 100%.

Figure 20:
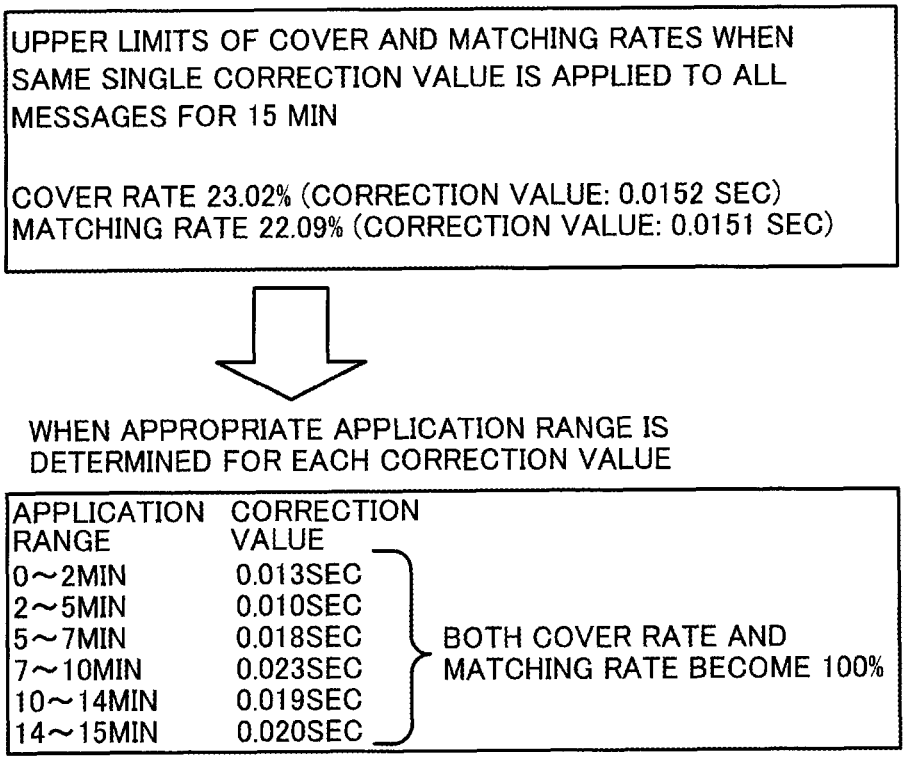
FIG. 20 illustrates differences in a matching rate and a cover rate with and without determination of an appropriate application range of each correction value.

FIG. 20 illustrates differences in a matching rate and a cover rate with and without determination of an appropriate application range of each correction value. The upper part of FIG. 20 illustrates an example of upper limits of the cover rate and the matching rate obtained when an appropriate application range of a correction value is not determined and the same single correction value is applied to all messages for fifteen minutes. In this example, the cover rate reaches an upper limit of 23.02% when the correction value is 0.0152 seconds, and the matching rate reaches an upper limit of 22.09% when the correction value is 0.0151 seconds. Thus, with no regard for an appropriate range of correction value application, no correction value allowing both the matching rate and the cover rate to be 100% may be found.

The lower part of FIG. 20 illustrates the cover rate and matching rate obtained when an appropriate application range of each correction value is determined and a different correction value is applied for each application range. As illustrated in FIG. 20, a log for 15 minutes is divided into six periods, each of which is determined as an application range. An appropriate correction value is obtained for each of the application ranges. For example, the correction value of an application range '0 to 2 minutes' is 0.013 seconds, and the correction value of an appropriate range '2 to 5 minutes' is 0.010 seconds. In this manner, when the time of messages in each application range is corrected using a corresponding correction value, both the cover rate and the matching rate become 100% over the entire application ranges.

As described above, the second embodiment determines an appropriate application range for each correction value, and thereby over the entire application ranges, time correction is achieved using correction values each satisfying limiting conditions for calling (higher-level) and called (lower-level) processes, which are represented by the matching rate and the cover rate. Correcting the time of message information of a lower-level layer using such correction values improves the reliability of transaction analysis.

(c) Other Embodiments

According to the second embodiment, to determine an application range of the same single correction value (a simultaneous correction set), both the cover rate and the matching rate are used, however, at least one of the cover rate and the matching rate may be used instead. In the case of using the matching rate only, for example, when a message pair with no transaction identifier is acquired, it may be unconditionally included in the simultaneous correction set. Alternatively, in the case of using the cover rate only, as for each message pair with a transaction identifier, collective ranges each allowing the execution period of a process corresponding to the message pair to be corrected to fall within the execution period of one of higher-level layer processes are determined as the time correction range of the message pair, in the same manner as for a message pair with no transaction identifier.

Time correction is made to lower-level layer messages according to the second embodiment, however, time differences are relative and, therefore, the time of higher-level layer messages may be corrected instead. Alternatively, time correction may be made to both higher-level layer and lower-level layer messages.

Note that the second embodiment does not consider the possibility that higher-level layer messages have failed to be observed due to errors in observation. In the case where higher-level layer messages have failed to be observed, for example, a higher-level layer message pair corresponding to a lower-level layer message pair with a transaction identifier may not be found. When a higher-level layer message pair having the same transaction identifier is not found, the time correcting unit 150 may correct the time of messages up to the last acquired message pair using the same single correction value, for example. At this point, if failing to find a higher-level layer message pair having the same transaction identifier occurs frequently, simultaneous correction for a plurality of message pairs with a transaction identifier may not be achieved, resulting in finely divided sets each subject to correction with the same single correction value. Note however that generation of such finely divided sets does not lead to a problematic increase in processing time or decrease in accuracy of the correction values.

Nonetheless, in order to prevent unnecessary segmentation of sets, each acquired message pair may be included in the simultaneous correction set, for example, while the cover rate may not be 100% but remains above a predetermined value (for example, 95% or more).

In the case where packet loss has occurred, a higher-level layer message pair corresponding to a lower-level layer message pair with a transaction identifier may not be found. In this case, the time correcting unit 150 may determine the time correction range of such a lower-level layer message pair in the same manner as for one with no transaction identifier.

In the course of calculating the matching rate and the cover rate, the second embodiment may obtain a time correction range not with respect to each lower-level layer message pair, but with respect to each lower-level layer message. For example, as for each database-layer message with a transaction identifier, a range allowing the time of the database-layer message to be corrected to fall within the execution period of a process corresponding to an application-layer message pair having the same transaction identifier may be determined as the time correction range of the database-layer message. As for each database-layer message with no transaction identifier, collective ranges each allowing the time of the database-layer message to be corrected to fall within the execution period of a process corresponding to one of application-layer message pairs may be determined as the time correction range of the database-layer message.

Message time correction is executed by the time correcting unit 150 according to the second embodiment, however, the transaction analyzing unit 160, for example, may perform the time correction at the time of transaction analysis. In that case, the time correcting unit 150 writes, for example, values indicating application ranges and correction values, as illustrated in FIG. 20, in a storage device such as a memory. Subsequently, at the time of transaction analysis, the transaction analyzing unit 160 reads messages from the individual message storing units, then determines in which application range the time added to each of the messages is included, and corrects the time of each message using a correction value corresponding to the determined application range.

The processing functions described in each of the embodiments above may be achieved by a computer. In this case, a program is provided which describes processing content of the functions to be implemented by the information processing apparatus 1 or the analyzer 100. By executing the program on the computer, the above-described processing functions are achieved on the computer. The program in which the processing content is described may be recorded on computer-readable recording media. Such computer-readable recording media include a magnetic storage device, an optical disk, a magneto-optical recording medium, and a semiconductor memory. Examples of the magnetic storage device are a HDD, a flexible disk (FD), and a magnetic tape. Examples of the optical disk are a DVD, a DVD-RAM, a CD-ROM, and a CD-RW. An example of the magneto-optical recording medium is a magneto-optical disk (MO). Note that transitory propagating signals per se are not considered here as a computer-readable recording medium.

To distribute the program, for example, portable recording media, such as DVDs and CD-ROMs, on which the program is recorded are sold. In addition, the program may be stored in a memory device of a server computer and then transferred from the server computer to another computer via a network.

A computer for executing the program stores, for example, in its own memory device, the program which is originally recorded on a portable recording medium or transferred from the server computer. Subsequently, the computer reads the program from its own memory device and performs processing according to the program. Note that the computer is able to read the program directly from the portable recording medium and perform processing according to the program. In addition, the computer is able to sequentially perform processing according to a received program each time such a program is transferred from a server computer.

In addition, at least part of the above-described processing functions may be achieved by an electronic circuit, such as a digital signal processor (DSP), an application specific integrated circuit (ASIC), and a programmable logic device (PLD).

According to one aspect, appropriate time correction is achieved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store records collected by capturing message signals transmitted from a first server and a second server; and
a hardware processor configured to perform a procedure including:
obtaining, from the records in the memory, first time stamps of a plurality of first processes executed by the first server;
obtaining, from the records in the memory, second time stamps of a plurality of second processes executed by the second server in response to a plurality of execution requests output according to the plurality of first processes;
calculating a first execution period of each of the first processes, based on the obtained first time stamps, and a second execution period of each of the second processes, based on the obtained second time stamps;
calculating, with respect to each of the second execution periods, a range of time correction values that, when added to two second time stamps constituting a second execution period of interest, cause the second execution period of interest to fall within one of the first execution periods;
generating a set of second execution periods which are chronologically consecutive and whose ranges of time correction values include a common time correction value, the common time correction value falling within each of the ranges of time correction values of the second execution periods belonging to the set;

correcting the second timestamps by using the common time correction value, with respect to the second processes corresponding to the set of second execution periods; and analyzing the first processes together with the second processes having the corrected second time stamps.

2. The information processing apparatus according to claim 1, wherein:

one or more of the first time stamps individually include an identifier of a transaction containing a first process;

one or more of the second time stamps individually include an identifier of a transaction containing a second process;

the calculating the first execution period of each of the first processes is performed based on a first time information pair including two first time stamps that respectively indicate a start time and an end time of a first process;

the calculating the second execution period of each of the second processes is performed based on a second time information pair including two second time stamps that respectively indicate a start time and an end time of a second process; and the calculating the range of time correction values includes finding a first time information pair and a second time information pair that share a same identifier, and determining a range of time correction values that cause the second execution period calculated from the found first time information pair to fall within the first execution period calculated from the found second time information pair.

3. The information processing apparatus according to claim 1, wherein:

the calculating the first execution period of each of the first processes includes finding a plurality of first time information pairs each including two first time stamps that respectively indicate a start time and an end time of a first process;

the calculating the second execution period of each of the second processes includes finding a second time information pair including two second time stamps that respectively indicate a start time and an end time of one of the second processes; and the calculating the range of time correction values includes determining time correction values that make the second execution period calculated from the found second time information pair fall within one of the plurality of first execution periods calculated from the plurality of first time information pairs.

4. The information processing apparatus according to claim 1, wherein:

one or more of the first time stamps individually include an identifier of a transaction containing a first process;

one or more of the second time stamps individually include an identifier of a transaction containing a second process;

the calculating the first execution period of each of the first processes includes finding a first time information pair including two first time stamps that respectively indicate a start time and an end time of a first process;

the calculating the second execution period of each of the second processes includes finding a second time information pair including two second time stamps that respectively indicate a start time and an end time of a second process; and the calculating the range of time correction values includes:

determining, with respect to a second time information pair including an identifier of a transaction, a first range of time correction values that cause the second execution period calculated from the second time information pair including the identifier to fall within the first execution period calculated from a first time information pair having a same identifier as the second time information pair, and determining, with respect to a second time information pair including no identifier, a second range of time correction values that cause the second execution period calculated from the second time information pair including no identifier to fall within one of a plurality of first execution periods calculated based on a plurality of first time information pairs of the plurality of first processes, the determined second range of time correction values being contained in the first range of time correction values determined based on the second time information pair including the identifier.

5. The information processing apparatus according to claim 4, wherein the calculating the range of time correction values begins with one of the second time information pairs including an identifier of a transaction.

6. An information processing method comprising:

capturing message signals transmitted from a first server and a second server and storing records of the capture message signals into a memory;

obtaining, by a hardware processor and from the records in the memory, first time stamps of a plurality of first processes executed by the first server;

obtaining, by the hardware processor and from the records in the memory, second time stamps of a plurality of second processes executed by the second server in response to a plurality of execution requests output according to the plurality of first processes;

calculating, by the hardware processor, a first execution period of each of the first processes, based on the obtained first time stamps, and a second execution period of each of the second processes, based on the obtained second time stamps;

calculating, by the hardware processor, with respect to each of the second execution periods, a range of time correction values that, when added to two second time stamps constituting a second execution period of interest, cause the second execution period of interest to fall within one of the first execution periods;

generating, by the hardware processor, a set of second execution periods which are chronologically consecutive and whose ranges of time correction values include a common time correction value, the common time correction value falling within each of the ranges of time correction values of the second execution periods belonging to the set;

correcting, by the hardware processor, the second timestamps by using the common time correction value, with respect to the second processes corresponding to the set of second execution periods; and analyzing, by the hardware processor, the first processes together with the second processes having the corrected second time stamps.

7. A non-transitory computer-readable storage medium storing a computer program causing a computer to perform a procedure comprising:
- obtaining, from records in a memory, first time stamps of a plurality of first processes executed by a first server, the memory storing records collected by capturing message signals transmitted from the first server and a second server;
- obtaining, from the records in the memory, second time stamps of a plurality of second processes executed by the second server in response to a plurality of execution requests output according to the plurality of first processes;
- calculating a first execution period of each of the first processes, based on the obtained first time stamps, and a second execution period of each of the second processes, based on the obtained second time stamps;
- calculating, with respect to each of the second execution periods, a range of time correction values that, when added to two second time stamps constituting a second execution period of interest, cause the second execution period of interest to fall within one of the first execution periods;
- generating a set of second execution periods which are chronologically consecutive and whose ranges of time correction values include a common time correction value, the common time correction value falling within each of the ranges of time correction values of the second execution periods belonging to the set;
- correcting the second timestamps by using the common time correction value, with respect to the second processes corresponding to the set of second execution periods; and
- analyzing the first processes together with the second processes having the corrected second time stamps.

* * * * *